US012395776B2

(12) United States Patent
Wang et al.

(10) Patent No.: US 12,395,776 B2
(45) Date of Patent: *Aug. 19, 2025

(54) BONE CONDUCTION EARPHONES AND METHODS FOR MAKING THE SAME

(71) Applicant: SHENZHEN SHOKZ CO., LTD., Guangdong (CN)

(72) Inventors: Yueqiang Wang, Shenzhen (CN); Zhongqi Wu, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,091

(22) Filed: Jul. 12, 2024

(65) Prior Publication Data

US 2024/0373159 A1 Nov. 7, 2024

Related U.S. Application Data

(63) Continuation of application No. 17/815,217, filed on Jul. 27, 2022, now Pat. No. 12,088,991, which is a (Continued)

(30) Foreign Application Priority Data

Apr. 30, 2020 (CN) ......................... 202010367151.6
Apr. 30, 2020 (CN) ......................... 202010367167.7

(Continued)

(51) Int. Cl.
*H04R 1/10* (2006.01)
*H04R 1/08* (2006.01)

(52) U.S. Cl.
CPC ............... *H04R 1/105* (2013.01); *H04R 1/08* (2013.01); *H04R 1/1066* (2013.01); *H04R 2460/13* (2013.01)

(58) Field of Classification Search
CPC ........ H04R 1/105; H04R 1/08; H04R 1/1066; H40R 2460/13

(Continued)

(56) References Cited

U.S. PATENT DOCUMENTS

2018/0146280 A1 5/2018 Tang
2021/0099789 A1 4/2021 Sha

FOREIGN PATENT DOCUMENTS

CN 207039852 U 2/2018
CN 207070280 U 3/2018

(Continued)

OTHER PUBLICATIONS

International Search Report in PCT/CN2021/089367 mailed on Jul. 13, 2021, 7 pages.

(Continued)

*Primary Examiner* — Sean H Nguyen
(74) *Attorney, Agent, or Firm* — Metis IP LLC

(57) ABSTRACT

The present disclosure discloses a bone conduction earphone. The bone conduction earphone may include a loudspeaker assembly. The bone conduction earphone may also include an ear hook assembly including a first ear hook housing, a connection member, and a second ear hook housing. One end of the connection member may be connected to the first ear hook housing, and the other end of the connection member may be connected to the loudspeaker assembly. The first ear hook housing may include a first sub-accommodating space, and the second ear hook housing may include a second sub-accommodating space. The first ear hook housing may be spliced and matched with the second ear hook housing by a first connection assembly such that the first sub-accommodating space and the second sub-accommodating space may be combined to form an accommodating space, and a length direction of the accom- (Continued)

modating space may be perpendicular to a thickness direction of the accommodating space.

20 Claims, 19 Drawing Sheets

Related U.S. Application Data continuation of application No. PCT/CN2021/089367, filed on Apr. 23, 2021.

(30) Foreign Application Priority Data

Apr. 30, 2020 (CN) ......................... 202020719627.3
Apr. 30, 2020 (CN) ......................... 202020719660.6

(58) Field of Classification Search
USPC ........................................................ 381/375
See application file for complete search history.

(56) References Cited

FOREIGN PATENT DOCUMENTS

| | | | |
|---|---|---|---|
| CN | 207070284 | U | 3/2018 |
| CN | 209402722 | U | 9/2019 |
| CN | 209627649 | U | 11/2019 |
| CN | 211880588 | U | 11/2020 |
| CN | 211880589 | U | 11/2020 |
| CN | 211880590 | U | 11/2020 |
| CN | 211880591 | U | 11/2020 |
| CN | 212463474 | U | 2/2021 |
| CN | 212628327 | U | 2/2021 |

OTHER PUBLICATIONS

Written Opinion in PCT/CN2021/089367 mailed on Jul. 12, 2021, 6 pages.

A-A

1900

BONE CONDUCTION EARPHONES AND METHODS FOR MAKING THE SAME

CROSS REFERENCE TO RELATED APPLICATIONS

This application is a Continuation of U.S. patent application Ser. No. 17/815,217, filed on Jul. 27, 2022, which is a Continuation of International Patent Application No. PCT/CN2021/089367, filed on Apr. 23, 2021, which claims priority of Chinese Patent Application No. 202020719627.3, filed on Apr. 30, 2020, Chinese Patent Application No. 202010367167.7, filed on Apr. 30, 2020, Chinese Patent Application No. 202020719660.6, filed on Apr. 30, 2020, and Chinese Patent Application No. 202010367151.6, filed on Apr. 30, 2020, the entire contents of which are incorporated herein by reference.

TECHNICAL FIELD

The present disclosure relates to the field of bone conduction earphones, in particular, relates to a bone conduction earphone.

BACKGROUND

Bone conduction is a manner of sound conduction. That is, sounds may be converted into mechanical vibrations with different frequencies and sound waves may be transmitted through skull, bone labyrinth, internal ear lymph, spiral organ, auditory nerve, or auditory center. The bone conduction earphones use bone conduction technologies to receive voice and close to the bones. The sound waves are directly transmitted to the auditory nerve through the bones. Therefore, ears may hear sounds without hurting the eardrum, which is welcomed by consumers. In addition, the bone conduction earphones may be portability and miniaturization with future development. However, existing ear hook structures of the bone conduction earphones may be not compact.

SUMMARY

The embodiments of the present disclosure provide a bone conduction earphone. The bone conduction earphone may comprise a loudspeaker assembly and an ear hook assembly including a first ear hook housing, a connection member, and a second ear hook housing. One end of the connection member may be connected to the first ear hook housing, and the other end of the connection member may be connected to the loudspeaker assembly. The first ear hook housing may include a first sub-accommodating space, and the second ear hook housing may include a second sub-accommodating space. The first ear hook housing may be spliced and matched with the second ear hook housing by a first connection assembly such that the first sub-accommodating space and the second sub-accommodating space may be combined to form an accommodating space, and a length direction of the accommodating space may be perpendicular to a thickness direction of the accommodating space.

In some embodiments, the first connection assembly may include a first slot and a first block. One of the first slot and the first block may be arranged on the first ear hook housing, and the other of the first slot and the first block may be arranged on the second ear hook housing. The first block may be matched and stuck connected to the first slot to restrict a relative movement of the first ear hook housing and the second ear hook housing along the length direction and the thickness direction.

In some embodiments, the first slot may be arranged on the first ear hook housing, and an opening direction of the first slot may face the first accommodating space. The first block may be arranged on the second ear hook housing, and the first block may be configured to be matched and stuck connected to the first slot.

In some embodiments, the first ear hook housing may be configured with an outer side hole segment and an inner side hole segment that communicate with each other from outside of the first sub-accommodating space to inside of the first sub-accommodating space. The outer side hole segment may be filled with a filling member, and the inner side hole segment may be designated as the first slot.

In some embodiments, a cross-sectional area of the outer side hole segment perpendicular to a communication direction of the outer side hole segment and the inner side hole segment may be greater than a cross-sectional area of the inner side hole segment perpendicular to the communication direction of the outer side hole segment and the inner side hole segment.

In some embodiments, the first connection assembly further may include a second slot and a second block. One of the second slot and the second block may be arranged on the first ear hook housing, and the other of the second slot and the second block may be arranged on the second ear hook housing. The second slot may be matched and stuck connected to the second block to restrict a relative movement of the first ear hook housing and the second ear hook housing along a splicing direction, and the splicing direction may be perpendicular to the length direction and the thickness direction.

In some embodiments, the first ear hook housing may be configured with the second slot. The first slot and the second slot may be arranged along the length direction and have a same opening direction. The second ear hook housing may be protrudingly configured with the second block. The first block may be arranged opposite to the first slot along the length direction, and the second block may be arranged opposite to the second slot along the length direction. In some embodiments, the first slot and the second slot may be arranged at intervals along the length direction.

In some embodiments, the first slot and the second slot may be arranged on two sides of the first ear hook housing along the length direction, respectively. The opening direction of the first slot may face the first sub-accommodating space, and the opening direction of the second slot may be away from the first sub-accommodating space. The first block and the second block may be arranged on two sides of the second ear hook housing along the length direction, respectively. An extension direction of the first block may be away from the second sub-accommodating space, and an extension direction of the second block may face the second sub-accommodating space.

In some embodiments, the first slot may be arranged on a side of the first ear hook housing close to the connection member. The second slot may be arranged on a side of the first ear hook housing away from the connection member.

In some embodiments, part of the second ear hook housing away from the connection member may be configured with a power plug-in hole. The power plug-in hole may communicate with the accommodating space, and the power plug-in hole may be configured to accommodate a power supply interface. The second block may be arranged adjacent to the power plug-in hole, and the second block may be closer to the accommodating space than the power plug-in hole. A projection of the second block and a projection of the power plug-in hole on a first reference plane perpendicular to the length direction may overlap each other.

In some embodiments, the projection of the second block and the projection of the power plug-in hole on a second reference plane perpendicular to the splicing direction may overlap each other.

In some embodiments, a splicing edge of the first ear hook housing may be matched with a splicing edge of the second ear hook housing to restrict the relative movement of the first ear hook housing and the second ear hook housing along the length direction.

In some embodiments, a splicing edge of the first ear hook housing may be configured with a first blocking part, and a splicing edge of the second ear hook housing may be configured with a second blocking part. The first blocking part may be matched with the second blocking part to restrict the relative movement of the first ear hook housing and the second ear hook housing along the length direction.

In some embodiments, the connection member may include an ear hook elastic metal filament, a joint part, and an ear hook elastic cover layer. The joint part may be connected to one end of the ear hook elastic metal filament, the ear hook elastic cover layer may at least cover the ear hook elastic metal filament, and the joint part may be configured to be plugged and matched with the loudspeaker assembly. The joint part may include a first wire stuck part, and the first ear hook housing may include a second wire stuck part. The ear hook elastic cover layer may be configured with a lead channel, a wiring group drawn out from the loudspeaker assembly may enter the accommodating space through the first wire stuck part, the lead channel, and the second wire stuck part in sequence, and the first wire stuck part and the second wire stuck part may be configured to stuck and stop the wiring group in a radial direction of the wiring group.

In some embodiments, the first wire stuck part may include two first wire sub-stuck members arranged at intervals along the thickness direction. The two first wire sub-stuck members may be staggered from each other along the length direction of the wiring group. The second wire stuck part may include two second wire sub-stuck members arranged at intervals along the thickness direction. the two second wire sub-stuck members may be arranged opposite to each other.

In some embodiments, the bone conduction earphone further may include a stick microphone assembly. The stick microphone assembly may include an elastic connecting rod and a sound pickup assembly. One end of the elastic connecting rod may be connected to the loudspeaker assembly, and the other end of the elastic connecting rod may be connected to the sound pickup assembly. The elastic connecting rod may be configured to cause an average amplitude attenuation rate of vibrations of a phonic frequency band generated by the loudspeaker assembly to be not less than a preset threshold when the vibrations transmit from one end of the elastic connecting rod to the other end of the elastic connecting rod.

In some embodiments, the loudspeaker assembly may include a first loudspeaker housing, a second loudspeaker housing, a loudspeaker, a rotation member, and a press-holding member. The first loudspeaker housing may be matched and connected to the second loudspeaker housing to form a containment space for containing the loudspeaker. The first loudspeaker housing may be configured with a first through-hole and a second through-hole arranged at intervals. The rotation member may be rotatably inserted into the first through-hole, and one end of the elastic connecting rod may be connected to the rotation member. The first through-hole and the second through-hole may communicate with the containment space such that the wiring group of the stick microphone assembly may pass through the first through-hole, the containment space, and the second through-hole. The press-holding member may be arranged in the containment space and cover the first through-hole, and the press-holding member may be configured to press and hold the wiring group of the stick microphone assembly that passes through the first through-hole to the second through-hole.

In some embodiments, the press-holding member may include a hardcover plate and an elastomer. The hardcover plate and the elastomer may be stacked, and the hardcover plate may be farther from the first through-hole than the elastomer. The elastomer may be configured to contact the wiring group, and a hardness of the hardcover plate may be greater than a hardness of the elastomer.

Another aspect of the present disclosure provides a method for manufacturing a bone conduction earphone. The method may comprise forming, by an integrated molding process, a first ear hook housing and a second ear hook housing. the integrated molding process may include any one or a combination of injection molding, 3D printing, extrusion molding, or blow molding.

In some embodiments, the method may include .forming, by the integrated molding process, an outer side hole segment and an inner side hole segment communicating with each other from outside of the first ear hook housing to inside of the first ear hook housing, and a first block may be arranged on the second ear hook housing. The method may also include filling a filling member in the outer side hole segment, and the inner side hole segment may be designated as a first slot. The method may also include splicing the first ear hook housing and the second ear hook housing through a matched and stuck connection of the first slot and the first block.

In some embodiments, the filling a filling member in the outer side hole segment may include filling, by the integrated molding process, the filling member in the outer side hole segment. After the filling of the filling member in the outer side hole segment, the method further may include covering, by the integrated molding process, the first ear hook housing with an ear hook elastic cover layer. the ear hook elastic cover layer may also cover the outer side hole segment.

BRIEF DESCRIPTION OF THE DRAWINGS

The present disclosure is further illustrated in terms of exemplary embodiments. These exemplary embodiments are described in detail with reference to the drawings. These embodiments are not limited, in these embodiments, and the same number denotes the same structure.

DETAILED DESCRIPTION

Figure 1:
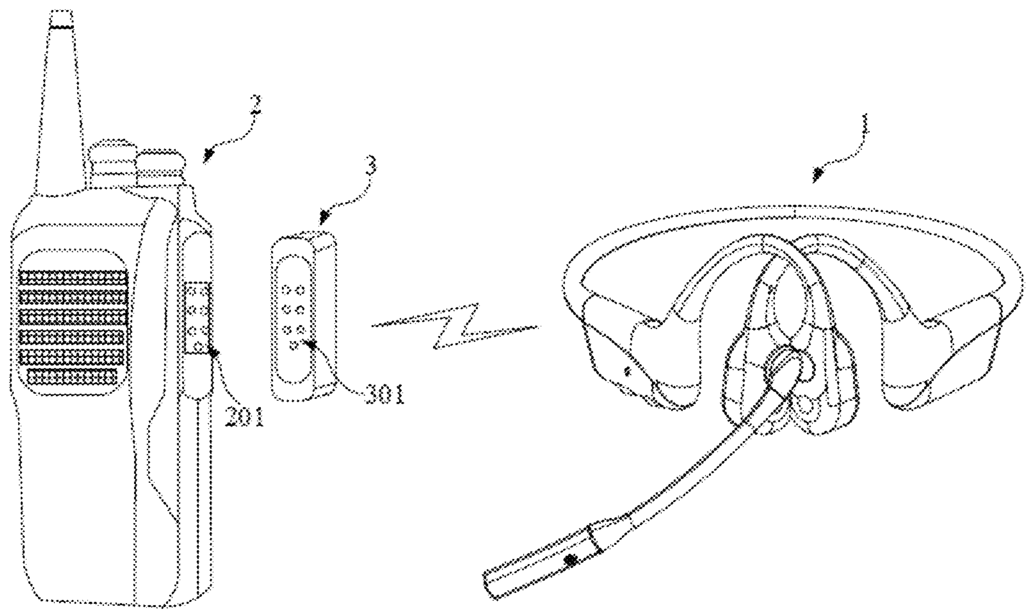
FIG. 1 is a structural diagram illustrating a communication system of a bone conduction earphone according to some embodiments of the present disclosure.

In order to illustrate technical solutions of the embodiments of the present disclosure more clearly, the following briefly illustrates drawings in the illustration of the embodiments. Drawings in the following illustration are merely some examples or embodiments of the present disclosure. For those skilled in the art, the present disclosure may be applied to other similar scenarios in accordance with the drawings without creative works. Unless obviously obtained from the context or the context illustrates otherwise, the same numeral in the drawings refers to the same structure or operation.

It should be understood that "system", "apparatus", "unit", and/or "module" used herein are a method for distinguishing different components, elements, members, parts, or assemblies of different levels. However, if other words may achieve the same purpose, the words may be replaced by other expressions.

As used in the disclosure and the appended claims, the singular forms "a," "an," and "the" include plural referents unless the content clearly dictates otherwise. In general, the terms "comprising" and "including" only prompt steps and elements that are explicitly identified, and these steps and elements do not constitute an exclusive list. Methods or apparatus may also include other steps or elements.

Flowcharts are used in the present disclosure to illustrate the operations performed by the system according to some embodiments of the present disclosure. It should be understood that the front or rear operations may not be necessarily performed exactly in order. On the contrary, each step may be performed in reverse or simultaneously. At the same time, other operations may also be added to the procedures, or a certain step or several steps may be removed from the procedures.

FIG. 1 is a structural diagram illustrating a communication system of a bone conduction earphone according to some embodiments of the present disclosure.

In some embodiments, the communication system may include a bone conduction earphone 1, an intercom device 2, and an external communication module 3.

The bone conduction earphone 1 may convert audio signals into mechanical vibrations with different frequencies. A human bone may be configured as a medium for transmitting the mechanical vibrations, and further transmitting sound waves to an auditory nerve, so that a user may receive sound without passing through an external auditory canal and a tympanic membrane of an ear of the user. In some embodiments, the bone conduction earphone 1 may have a Bluetooth function.

The intercom device 2, i.e., a walkie-talkie, may be a terminal device of cluster communication or a wireless communication device of mobile communication. In general, the walkie-talkie may convert an electrical signal of the audio signals into a radio-frequency carrier signal through a transmitting assembly. The radio-frequency carrier signal may be further transmitted through an antenna via amplification, filtering, or the like, so as to transmit the user's voice. The antenna may receive an input signal processed through corresponding conversion, filtering, amplification, mixing, or the like, to form an audio signal, and the audio signal may be played by the loudspeaker, so that the user can hear the audio signals sent by other intercom devices. The intercom device 2 in some embodiments may be an existing intercom device, and components and structures of the intercom device 20 are not described in detail herein.

In some embodiments, the existing intercom devices may not support the Bluetooth function. In order to enable the bone conduction earphone 1 to have an effective Bluetooth connection with the intercom device 2, an external communication module 3 may be used as a Bluetooth communication medium between the bone conduction earphone 1 and the intercom device 2.

In some embodiments, the intercom device 2 may include a first external interface 201. The intercom device 2 may provide the first external interface 201 for extending the function of the intercom device 2, and different functions may be achieved by connecting different external modules. External terminals may provide programs for the intercom device 2 via the first external interface 201. The first external interface 201 may include a plurality of contact points spaced at an interval (shown in FIG. 1, but not labeled), such as 7 contact points.

The external communication module 3 may include a second external interface 301. The external communication module 3 may be detachably arranged on the intercom device 2, for example, the external communication module 3 may be fixed to the intercom device 2 by snapping. The second external interface 301 may also have contact points the same as the first external interface 201. When the external communication module 3 is installed on the intercom device 2, the first external interface 201 may be connected to the second external interface 301. The external communication module 3 may be coupled to the intercom device 2 through the first external interface 201 and the second external interface 301. The intercom device 2 may be configured with a Bluetooth function through the external communication module 3.

Figure 2:
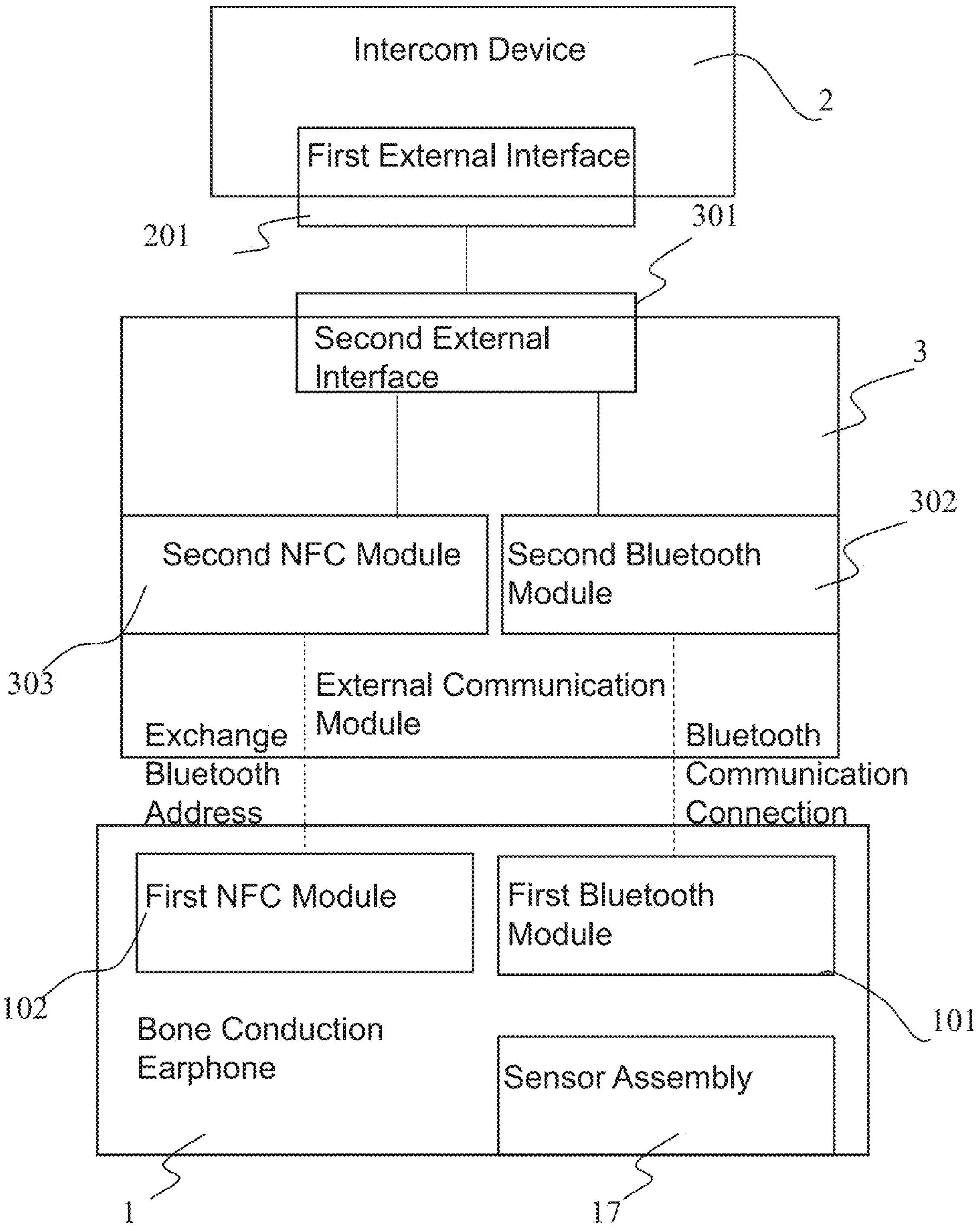
FIG. 2 is a block diagram illustrating a communication system of a bone conduction earphone according to some embodiments of the present disclosure.

FIG. 2 is a block diagram illustrating a communication system of a bone conduction earphone according to some embodiments of the present disclosure;

As shown in FIG. 2, the bone conduction earphone may include a first Bluetooth module 101, a first NFC module 102, and a sensor assembly module 17.

As shown in FIG. 2, the external communication module 3 may also include a second Bluetooth module 302, and the intercom device 2 may establish a Bluetooth connection with the bone conduction earphone 1 through the external communication module 3. After the Bluetooth connection between the intercom device 2 and the bone conduction earphone 1 is established through the external communication module 3, the bone conduction earphone 1 may be used to control the intercom device 2. For example, the bone conduction earphone 1 may be used to answer audio signals received by the intercom device 2. The bone conduction earphone 1 may also be used to transmit corresponding voice. The bone conduction earphone 1 may also control other functions of the intercom device 20. In some embodiments, the intercom device 2 may also control the bone conduction earphone 1.

In some embodiments, in order to facilitate a rapid Bluetooth connection between the bone conduction earphone 1 and the intercom device 2, a Bluetooth address may be exchanged between the bone conduction earphone 1 and the intercom device 2 quickly to facilitate a fast pairing. As shown in FIG. 2, the bone conduction earphone 1 may also have a near-field communication (NFC) function and may include a first NFC module 102, which may be configured to implement the near-field communication function. The external communication module 30 may also include a second NFC module 303, which may enable the intercom device 2 without the NFC near-field communication function to realize near-field communication.

Specifically, the bone conduction earphone 1 and the intercom device 2 may exchange the Bluetooth address by the near-field communication of the first NFC module 102 and the second NFC module 303, so that a Bluetooth connection may be established between the first Bluetooth module 101 and the second Bluetooth module 302 by a Bluetooth pairing.

The intercom device 2 may realize a fast Bluetooth connection through the second NFC module 303 of the external communication module 3 and the first NFC module 102 of the bone conduction earphone 1, such that the intercom device 2 may be quickly matched with different bone conduction earphones 1.

In some embodiments, in order to facilitate a control between the intercom device 2 and the bone conduction earphone 1 and realize the switching of related functions between the intercom device 2 and the bone conduction earphone 1 automatically, sensing and controlling may be carried out by a corresponding sensor. An example is provided in the following descriptions.

As shown in FIG. 2, the bone conduction earphone 1 may include a sensor assembly 17 for detecting whether the bone conduction earphone 1 is worn by a user. Specifically, the sensor assembly 17 may include, for example, an optical sensor, which may detect whether the bone conduction earphone 1 is worn by transmitting and/or receiving a corresponding optical signal. The optical sensor, for example, a low beam sensor emitting a respective optical signal, may emit light by reflecting the optical signal when the bone conduction earphone 1 is worn, and may not reflect light when the bone conduction earphone 1 is not worn. The low beam sensor may detect whether the bone conduction earphone 1 is worn or perform a distance measurement according to whether reflected light is received. The low beam sensor may be, for example, an infrared low beam sensor. The sensor assembly 17 may also include an acceleration sensor, a gravity sensor, a touch sensor, or the like.

Exemplary structures of the bone conduction earphone 1 may be described below according to embodiments of the bone conduction earphone 1.

Figure 3:
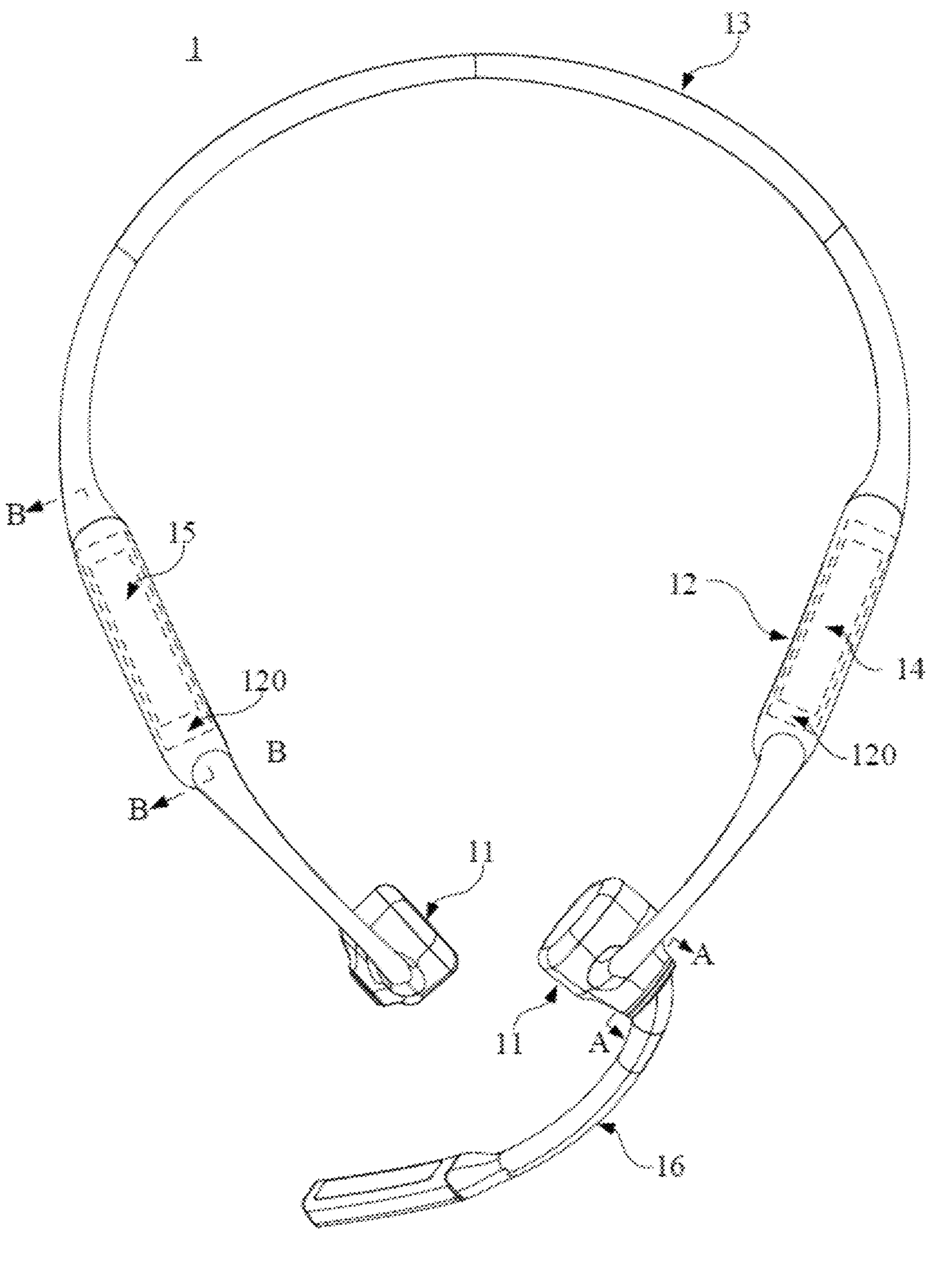
FIG. 3 is a top plan view illustrating an overall structure of a bone conduction earphone according to some embodiments of the present disclosure.
Figure 4:
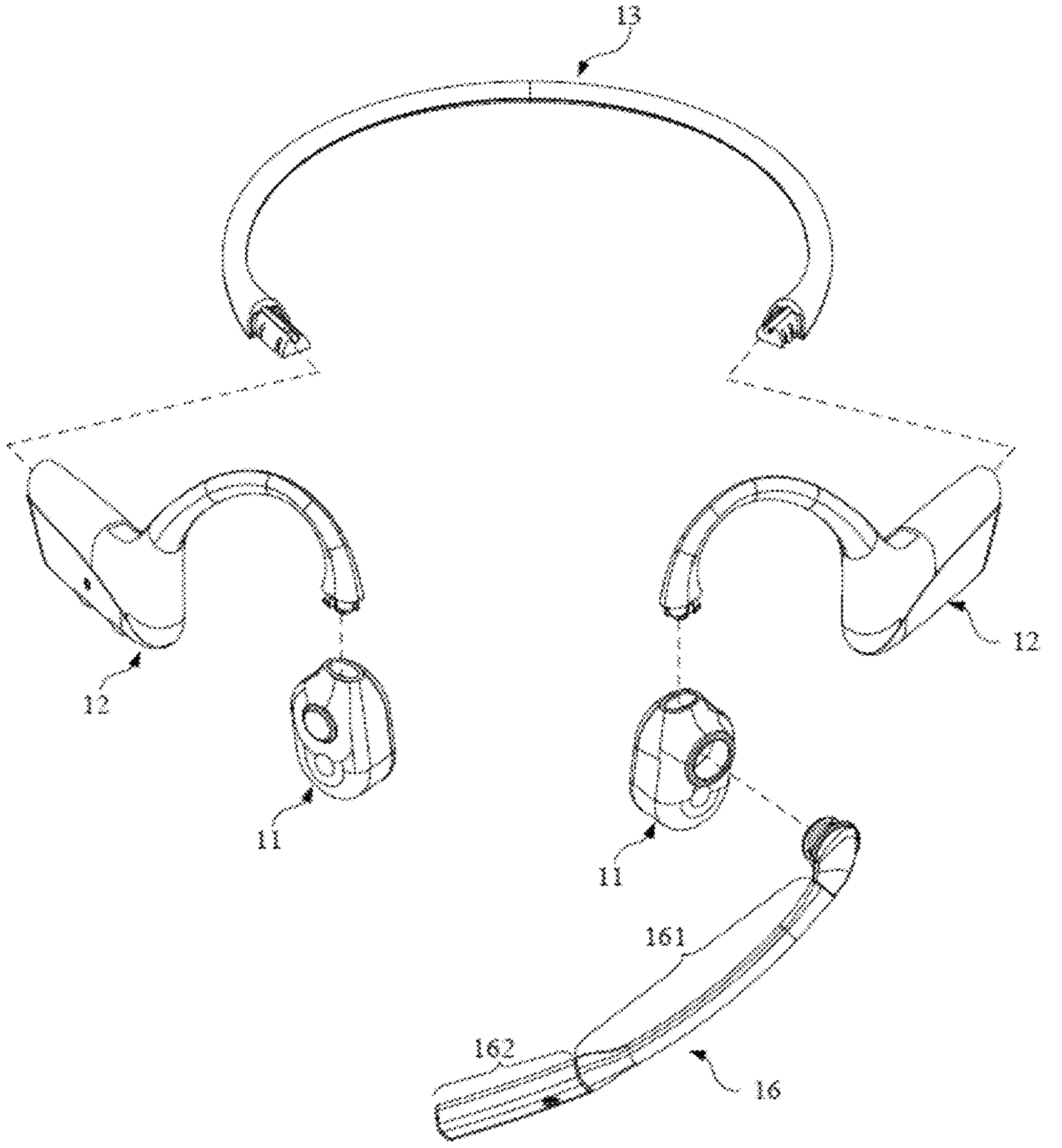
FIG. 4 is an exploded diagram illustrating an overall structure of a bone conduction earphone according to some embodiments of the present disclosure.

FIG. 3 is a top plan view illustrating an overall structure of a bone conduction earphone according to some embodiments of the present disclosure. FIG. 4 is an exploded diagram illustrating an overall structure of a bone conduction earphone according to some embodiments of the present disclosure.

As shown in FIG. 3 and FIG. 4, in some embodiments, the bone conduction earphone may include two loudspeaker assemblies 11, two ear hook assemblies 12, a rear hook assembly 13 connected between the two ear hook assemblies 12, a battery assembly 14, and a control circuit assembly 15.

The two loudspeaker assemblies 11 may be connected to the two ear hook assemblies 12, respectively. The ear hook assembly 12 may be connected between the rear hook assembly 13 and the loudspeaker assembly 11. The ear hook assembly 12 may be configured with an accommodating space 120. The accommodating space 120 of one of the ear hook assemblies 12 may be configured to accommodate the battery assembly 14, and the accommodating space 120 of the other ear hook assembly 12 may be configured to accommodate the control circuit assembly 15. The battery assembly 14 may be used to supply power to the bone conduction earphone 1, and the control circuit assembly 15 may be used to control the work of the bone conduction earphone 1 and implement corresponding operations.

In some embodiments, the bone conduction earphone may further include a stick microphone assembly 16 for picking up sounds. The stick microphone assembly 16 may be connected to the loudspeaker assembly 11. The number or count of the stick microphone assembly 16 may be one, which is connected to one of the two loudspeaker assemblies 11. For example, the stick microphone assembly 16 may be connected to the loudspeaker assembly 11 corresponding to the battery assembly 14. In some embodiments, each loudspeaker assembly 11 may be connected to a stick microphone assembly 16. As shown in FIG. 4, the stick microphone assembly 16 may include an elastic connecting rod 161 and a sound pickup assembly 162. One end of the elastic connecting rod 161 may be connected to the loudspeaker assembly 11. The other end of the elastic connecting rod 161 may be connected to the sound pickup assembly 162. The sound pickup assembly 162 may include one or more microphones. For example, the number of microphones of the sound pickup assembly 162 may be greater than or equal to 2, and the microphones may be spaced apart. For example, a microphone may be arranged at an end of the sound pickup assembly 162 away from the loudspeaker assembly 11, and other microphones may be arranged on one side that the sound pickup assembly 162 is connected to the end, which may facilitate a cooperation among multiple microphones, thus reducing the noise and improving the quality of the picked-up sound. The loudspeaker assemblies 11 may convert the audio into the mechanical vibrations, that is, when the loudspeaker assemblies 11 are playing corresponding audio, a phonic band corresponding to the audio may cause a loudspeaker 113 to generate the corresponding vibrations.

In some embodiments, the stick microphone assembly 16 may include the elastic connecting rod 161. In some embodiments, the elastic connecting rod 161 may be configured to cause that an average amplitude attenuation rate of vibrations within a phonic frequency band generated by the loudspeaker assembly 11 is not less than a preset threshold when the vibrations transmit from one end of the elastic connecting rod to the other end of the elastic connecting rod. For example, the elastic connecting rod may be configured to cause an average amplitude attenuation rate of vibrations within a phonic frequency band generated by the loudspeaker assembly 11 to be not less than 35% when the vibrations transmit from one end of the elastic connecting rod to the other end of the elastic connecting rod. In some embodiments, the average amplitude attenuation rate may be not less than 45%. In some embodiments, the average amplitude attenuation rate may be not less than 50%. In some embodiments, the average amplitude attenuation rate may be not less than 55%. In some embodiments, the average amplitude attenuation rate may be not less than 60%. In some embodiments, the average amplitude attenuation rate may be not less than 70%.

In actual use, the mechanical vibrations generated by the loudspeaker assemblies 11 of the bone conduction earphone 1 may cause a negative effect on the pickup effect of the stick microphone assembly 16, such as an echo. In some embodiments, the elastic connecting rod 161 may be configured to cause the average amplitude attenuation rate of the vibrations within the phonic band generated by the loudspeaker assemblies 11 to be not less than 35% when the vibrations transmit from one end of the elastic connection rod 161 to the other end of the elastic connection rod 161, so that the elastic connection rod 161 may effectively absorb the vibrations during vibration transmission and reduce the vibration amplitude of the elastic connecting rod 161 transmitted from one end to the other end, thereby reducing the vibrations generated by the loudspeaker assemblies 11, which causes the vibrations of the sound pickup assembly 162, effectively reducing the influence of the vibrations of the loudspeaker assemblies 11 on the pickup effect of the sound pickup assembly 162, and improving the sound pickup quality.

Figure 5:
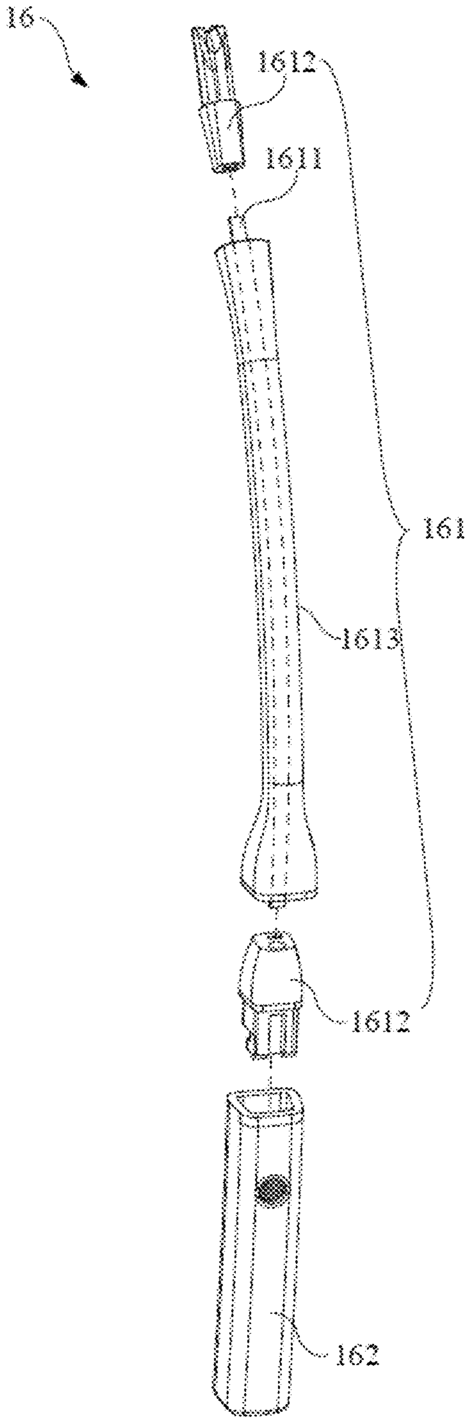
FIG. 5 is a disassembly diagram illustrating a structure of a stick microphone assembly according to some embodiments of the present disclosure.

FIG. 5 is a disassembly diagram illustrating a stick microphone assembly of a bone conduction earphone according to some embodiments of the present disclosure.

As shown in FIG. 5, the elastic connecting rod 161 may include an elastic metal filament 1611 and plug-in parts 1612 connecting to two ends of the elastic metal filament 1611, respectively. That is, two ends of the elastic metal filament 1611 may be connected with a plug-in part 1612, respectively. One of the plug-in parts 1612 may be configured to match and plug in the sound pickup assembly 162. The other plug-in parts 1612 may be configured to match and plug in the loudspeaker assembly 11. The plug-in structures of the two plug-in parts 1612 may be the same or different. The plug-in parts 1612 may be matched to the plug-in structures corresponding to the sound pickup assembly 162 and the loudspeaker assemblies 11.

In some embodiments, the elastic modulus of the elastic metal filament 1611 may be 70 Gpa to 90 Gpa. In some embodiments, the elastic modulus of the elastic metal filament 1611 may be 75 Gpa to 85 Gpa. In some embodiments, the elastic modulus of the elastic metal filament 1611 may be 80 Gpa to 84 Gpa. In some embodiments, the elastic modulus of the elastic metal filament 1611 may be 81 Gpa to 83 Gpa. The material of the elastic metal filament 1611 may be spring steel, titanium, other metallic or non-metallic materials. By setting the elastic modulus of the elastic metal filament 1611 to be 70 Gpa to 90 Gpa, the elastic metal filament 1611 may have a good capability to absorb the vibrations, which may meet the requirements of the vibration absorbing capability for the stick microphone assembly 16, thereby improving the pickup quality of the sound pickup assembly 162.

As shown in FIG. 5, in some embodiments, the elastic connecting rod 161 may also include an elastic cover layer 1613 covering the periphery of the elastic connecting rod 1611. The elastic modulus of the elastic cover layer 1613 may be 0.5 Gpa to 2 Gpa. In some embodiments, the elastic modulus of the elastic cover layer 1613 may be 0.8 Gpa to 1.5 Gpa. In some embodiments, the elastic modulus of the elastic cover layer 1613 may be 1.2 Gpa to 1.4 Gpa. The elastic cover layer 1613 may further cover part of the plug-in parts 1612, and may further protect the elastic metal filament 1611 and the plug-in parts 1612 at the same time. The material of the elastic cover layer 1613 may be silica gel, rubber, plastic, or the like. In some embodiments, a lead channel may be arranged on the elastic cover layer 1613 along a length direction of the elastic cover layer 1613, and the lead channel and the elastic metal filament 1611 may be arranged in parallel and spaced apart. Buried wiring grooves communicating with the lead channel may be arranged on the plug-in parts 1612 (not shown in the figure). The wiring group for connecting the sound pickup assembly 162 may enter into the lead channel through the buried wiring grooves of adjacent plug-in parts 1612, and further enter into the loudspeaker assemblies 11 through the other plug-in part 1612.

By setting the elastic modulus of the elastic cover layer 1613 to 0.5-2 Gpa, and due to the elastic cover layer 1613 covering the outside of the elastic metal filament 1611, the vibrations transmitted outward by the elastic metal filament 1611 may be further absorbed, thereby forming the effect of internal and external coordinated vibration absorption, which may improve the vibration absorption effect of the stick microphone assembly 16 greatly, reduce the vibrations transmitted to the sound pickup assembly 162 effectively, and improve the sound pickup quality.

Figure 6:
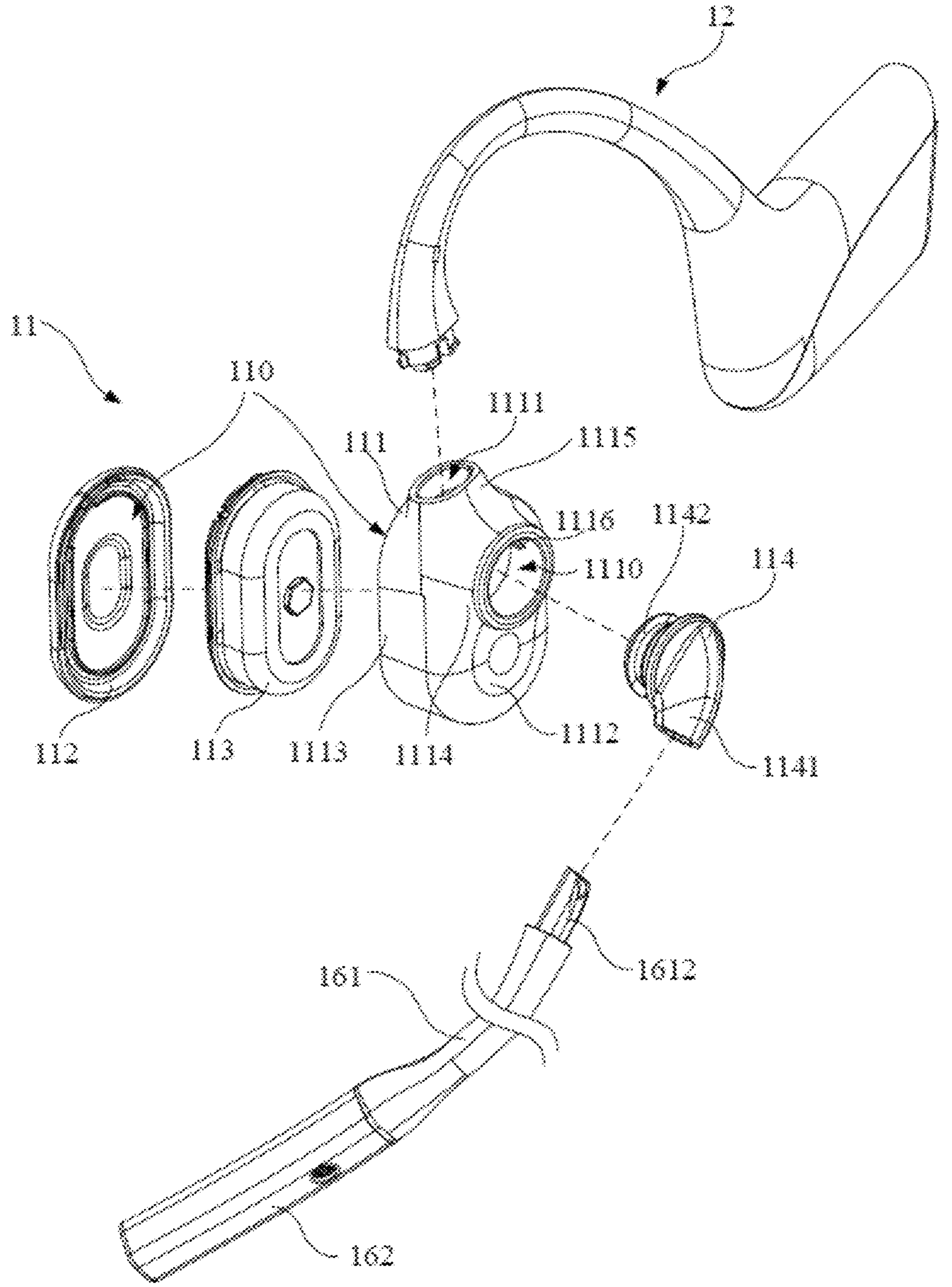
FIG. 6 is an exploded diagram illustrating a structure of a loudspeaker assembly according to some embodiments of the present disclosure.

FIG. 6 is an exploded diagram illustrating a structure of a loudspeaker assembly according to some embodiments of the present disclosure.

As shown in FIG. 6, the loudspeaker assembly 11 may include a first loudspeaker housing 111, a second loudspeaker housing 112, and the loudspeaker 113. The first loudspeaker housing 111 may be matched and connected to the second loudspeaker housing 112 to form a containment space 110 for accommodating the loudspeaker 113.

The first loudspeaker housing 111 may be matched to and inserted into one end of the elastic connecting rod 161. In some embodiments, in order to facilitate the adjustment of the pickup position of the stick microphone assembly 16, the stick microphone assembly 16 may be configured to be rotatable relative to the first loudspeaker housing 111. In some embodiments, the loudspeaker assembly 11 may include a rotation member 114. The first loudspeaker housing 111 may be configured with a first through-hole 1110. The rotation member 114 may be inserted into the first through-hole 1110 rotatably, and a plug-in part 1612 may be matched to and inserted into the rotation member 114 so that the stick microphone assembly 16 may be rotatable relative to the first loudspeaker housing 111.

A second through-hole 1111 may be arranged on the first loudspeaker housing 111 spaced apart from the first through-hole 1110. The second through-hole 1111 may be matched to and inserted into the ear hook assembly 12 so that the loudspeaker assembly 11 may be connected to the ear hook assembly 12. The first through-hole 1110 and the second through-hole 1111 may be in communication with the containment space 110.

In some embodiments, the first loudspeaker housing 111 may include a bottom wall 1112 and a sidewall 1113 connecting with each other. The sidewall 1113 may surround and connect with the bottom wall 1112, and the second loudspeaker housing 112 may be arranged covering one side of the sidewall 1113 deviate from the bottom wall 1112 to form the containment space 110 for accommodating the loudspeaker 113. The first through-hole 1110 may be formed on the bottom wall 1112, and the second through-hole 1111 may be formed on the sidewall 1113. The first through-hole 1110 may be formed on one side of the bottom wall 1112 close to the second through-hole 1111 so that the first through-hole 1110 may be close to the second through-hole 1111. In some embodiments, the bottom wall 1112 may include a first convex part 1114 protruding in a direction away from the containment space 110, and the first through-hole 1110 may be formed on the first convex part 1114. The sidewall 1113 may include a second convex part 1115 protruding in a direction away from the containment space 110. The second through-hole 1111 may be formed on the second convex part 1115. The convex direction of the first convex part 1114 may be perpendicular to the convex direction of the second convex part 1115, and a connection between the first convex part 1114 and the second convex part 1115 may be an arched connection.

Since the first convex part 1114 is arranged on the bottom wall 1112, the second convex part 1115 is arranged on the sidewall 1113, the convex direction of the first convex part 1114 and the convex direction of the second convex part 1115 may be perpendicular to each other, and the connection between the first convex part 1114 and the second convex part 1115 is an arched connection, the structural strength and structural stability of the first loudspeaker housing 111 may be enhanced through the first convex part 1114 and the second convex part 1115 arranged on the bottom wall 1112 and the sidewall 1113, respectively. The rotation member 114 may be inserted into the first through-hole 1110 of the first convex part 1114. The rotation of the stick microphone assembly 16 may not be interfered from the first loudspeaker housing 111 via the first convex part 1114 with a corresponding height. Possible mutual interferences between the ear hook assembly 12 and the stick microphone assembly 16 may be reduced in a case that the convex direction of the convex part 1114 and the convex direction of the second convex part 1115 are perpendicular to each other.

In some embodiments, the sound pickup assembly 162 may connect other related assemblies of the bone conduction earphone 1 via the corresponding wiring group, for example, the battery assembly 14 or the control circuit assembly 15, so that the acquired audio signal may be transmitted to the related assemblies for subsequent processing. A wiring group of the stick microphone assembly 16 may pass through the elastic cover layer 1613 of the elastic connecting rod 161 and may be led outside via the plug-in parts 1612. The wiring group of the stick microphone assembly 16 may be led outside by passing through the plug-in parts 1612 and enter the inside of the first loudspeaker housing 111. Specifically, the wiring group of the stick microphone assembly 16 may traverse the first through-hole 1110 and reach the inside of the second through-hole 1111 via the containment space 110. The wiring group of the stick microphone assembly 16 may traverse the ear hook assembly 12 and reach the inside of the accommodating space 120 via the second through-hole 1111, and be connected to the battery assembly 14 or the control circuit assembly 15 electrically.

In actual use, the stick microphone assembly 16 may be rotatable relative to the first loudspeaker housing 111. When the stick microphone assembly 16 rotates, the wiring group of the stick microphone assembly 16 may move, and the rotation of the stick microphone assembly 16 may be restricted due to improper movement of the wiring group of the stick microphone assembly 16. The wiring group of the stick microphone assembly 16 may also transmit the mechanical vibrations generated by the loudspeaker assembly 11 to the sound pickup assembly 162, which in turn affects the sound pickup effect of the sound pickup assembly 162 and the stability of the electrical connection. Based on the reasons mentioned above, the present disclosure provides the loudspeaker assemblies 11 to solve the technical problems mentioned above.

Figure 7:
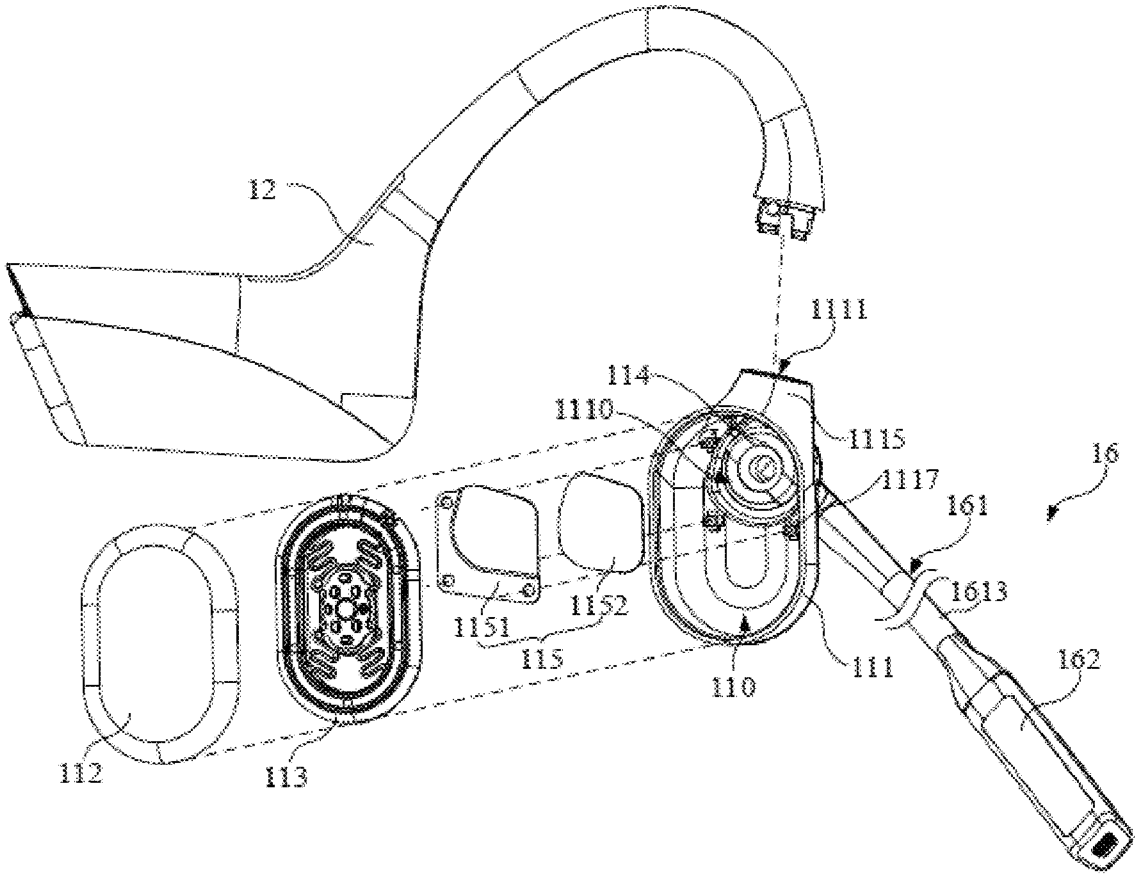
FIG. 7 is an exploded diagram illustrating a structure of a loudspeaker assembly according to some embodiments of the present disclosure.

FIG. 7 is another exploded diagram illustrating a structure of a loudspeaker assembly according to some embodiments of the present disclosure.

As shown in FIG. 7, the loudspeaker assembly may include a press-holding member 115 configured to press the wiring group of the stick microphone assembly 16. Specifically, the press-holding member 115 may be arranged in the containment space 110 and cover the first through-hole 1110 for pressing and holding the wiring group of the stick microphone assembly 16 passing through the first through-hole 1110 and reaching the second through-hole 1111. The press-holding member 115 may restrict the movable space of the wiring group of the stick microphone assembly 16, reduce the shaking or movement of the wiring group of the stick microphone assembly 16, and further reduce the vibrations generated by the vibration of the loudspeaker assembly 11 and the vibrations transmitted to the sound pickup assembly 162. The sound pickup effect of the sound pickup assembly 162 and the stability of the electricity performance may also be improved. In addition, the pressing and holding of the press-holding member 115 may reduce the friction between the wiring group of the stick microphone assembly 16 and the first loudspeaker housing 111, thereby the wiring group of the stick microphone assembly 16 may be protected. The containment space 110 may be formed based on the first loudspeaker housing 111 being matched and connected to the second loudspeaker housing 112. It should be noted that the containment space 110 labeled at the first loudspeaker housing 111 shown in FIG. 7 is only for illustration purposes. In addition, since the rotation member 114 is inserted into the first through-hole 1110, the first through-hole 1110 may be occupied by the rotation member 114. Therefore, in FIG. 7, the first through-hole 1110 is labeled at the rotation member 114, which is for the convenience of understanding and description.

The press-holding member 115 may include a hardcover 1151 and an elastomer 1152 arranged in a stacked manner. The hardcover 1151 may be spaced away from the first through-hole 1110 than the elastomer 1152 and the elastomer 1152 may be configured to contact the wiring group of the stick microphone assembly 16. The hardness of the hardcover 1151 may be greater than the hardness of the elastomer 1152. The hardcover 1151 may contact the wiring group of the stick microphone assembly 16 by pressing and holding the elastomer 1152. Since the hardness of the hardcover 1151 is greater than the hardness of the elastomer 1152, the hardcover 1151 with greater hardness may ensure the stiffness pressing and holding the wiring group of the stick microphone assembly 16, and the elastomer 1152 with smaller hardness may improve the absorption of movement and the vibrations of the wiring group of the stick microphone assembly 16, thereby reducing the vibrations of the wiring group of the stick microphone assembly 16 to play a role of buffer and protection.

In some embodiments, convex cylinders 1171 may be arranged on the periphery of the first through-hole 1110 and extending into the containment space 110. A plurality of convex cylinders 1171 may be arranged on the periphery of the first through-hole 1110 at an interval. The hardcover 1151 may be fixed on the plurality of convex cylinders 1171, and the elastomer 1152 may be arranged among the plurality of convex cylinders 1171. For example, the number or count of the convex cylinders 1171 may be three. The hardcover 1151 may be fixed by the plurality of convex cylinders 1171 arranged on the periphery of the first through-hole 1110, and the elastomer 1152 may press and hold the wiring group of the stick microphone assembly 16, which in turn improves the stability of the hardcover 1151 and the stability of the elastomer 1152 contacting the wiring group.

In some embodiments, the hardcover 1151 may be a steel sheet, and the elastomer 1152 may be a bubble foam. In some embodiments, the hardcover 1151 may also be other materials, such as plastic, ceramic, or the like. In some embodiments, the elastomer 1152 may be other materials, such as silica gel, fiber, or the like.

The wiring group of the stick microphone assembly 16 may be pressed and held via the press-holding member 115, the vibrations of the wiring group of the stick microphone assembly 16 generated by the vibrations of the loudspeaker assembly 11 may be reduced, the stability of the wiring group may be enhanced during the process of rotating of the stick microphone assembly 16, and the wiring group of the stick microphone 16 may also be protected. In some embodiments, the stick microphone assembly 16 may also have good stability during the process of rotating, that is, a matching structure of the rotation member 114 and the first through-hole 1110 may have a greater effect on the rotation stability of the stick microphone assembly 16. The following is an exemplary description of the structure of the rotation member 114.

Figure 8:
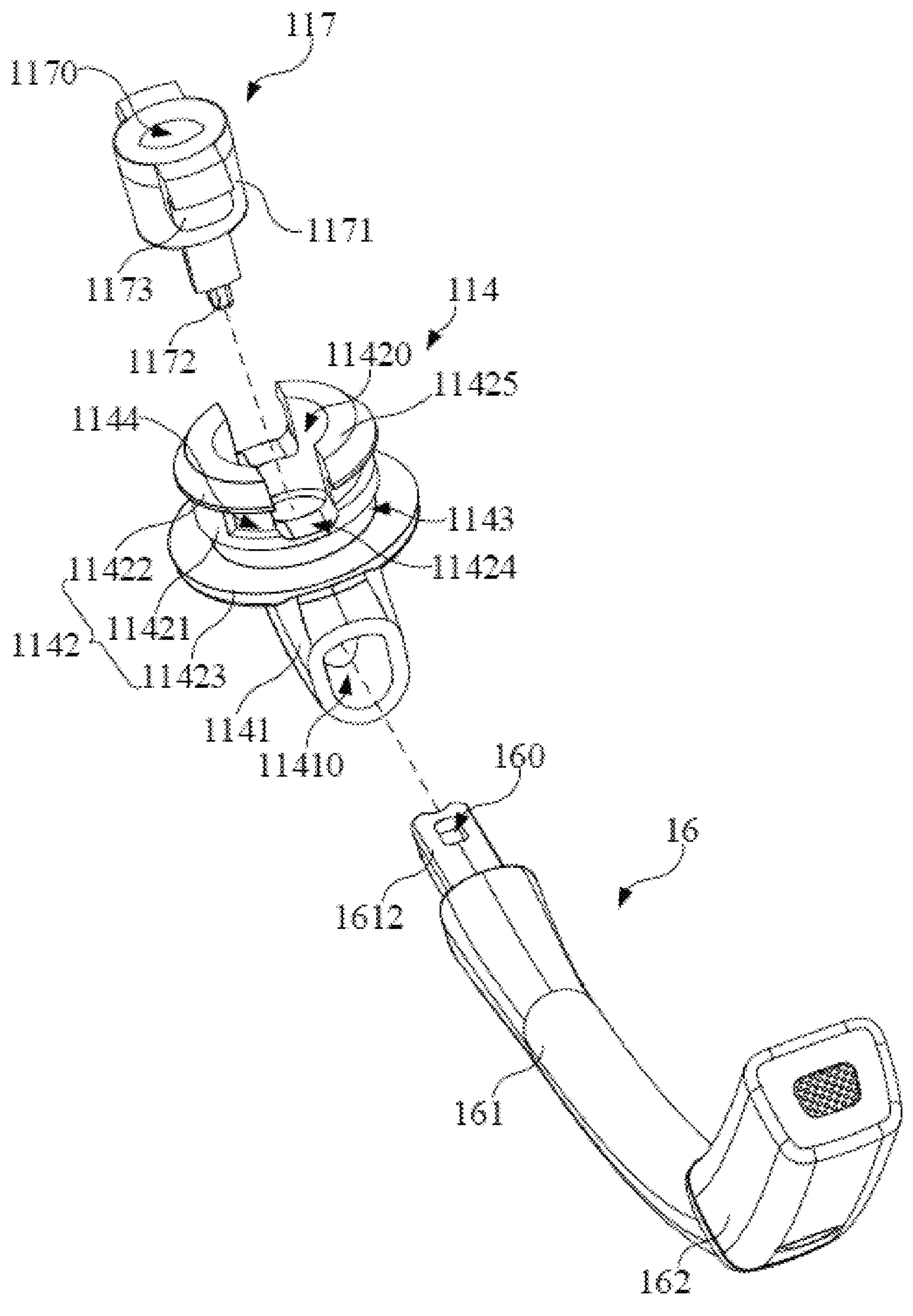
FIG. 8 is a structural diagram illustrating a fixing member, a rotation member, a connection member, and a stick microphone assembly according to some embodiments of the present disclosure.

FIG. 8 is a structural diagram illustrating a fixing member, a rotation member, a connection member, and a stick microphone assembly according to some embodiments of the present disclosure.

As shown in FIG. 8, the rotation member 114 may include a wire-guiding part 1141 and a rotation part 1142 connecting with each other. The wire-guiding part 1141 may be configured to be connected to the stick microphone assembly 16. The rotation part 1842 may be inserted in the first through-hole 1110 and may be rotatable relative to the first loudspeaker housing 111. The wiring group of the stick microphone assembly 16 may enter the containment space 110 via the wire-guiding part 1141 and the rotation part 1142. In some embodiments, the wire-guiding part 1141 may be configured with a first hole segment 11410. The rotation part 1142 may be configured with a second hole segment 11420 along an axial direction. The first hole segment 11410 may communicate with the second hole segment 11420. The plug-in parts 1612 of the stick microphone assembly 16 may be inserted into the first hole segment 11410 of the wire-guiding part 1141. The wiring group of the stick microphone assembly 16 may enter the containment space 110 via the first hole segment 11410 and the second hole segment 11420. In some embodiments, an angle between an extending direction of the first hole segment 11410 and an extending direction of the second hole segment 11420 may be less than 180°. In some embodiments, the angle between the extending direction of the first hole segment 11410 and the extending direction of the second hole segment 11420 may be less than 150°.

The rotation part 1142 may include a rotation main body 11421, and a first stopping part 11422 and a second stopping part 11423 protruding from two ends of the rotation main body 11421 may be arranged along a radial direction of the rotation main body 11421, respectively. In some embodiments, the rotation main body 11421 may be configured with a cylindrical shape, and the second hole segment 11420 may be arranged along the axial direction of the rotation main body 11421. In some embodiments, the first stopping part 11422 and the second stopping part 11423 may be arranged on the periphery of the rotation main body 11421, which are arranged in an annular shape or open loops. Specifically, the first stopping part 11422 may be away from the wire-guiding part 1141 than the second stopping part 11423, and the second stopping part 11423 may be close to the wire-guiding part 1141 than the first stopping part 11422.

Figure 9:
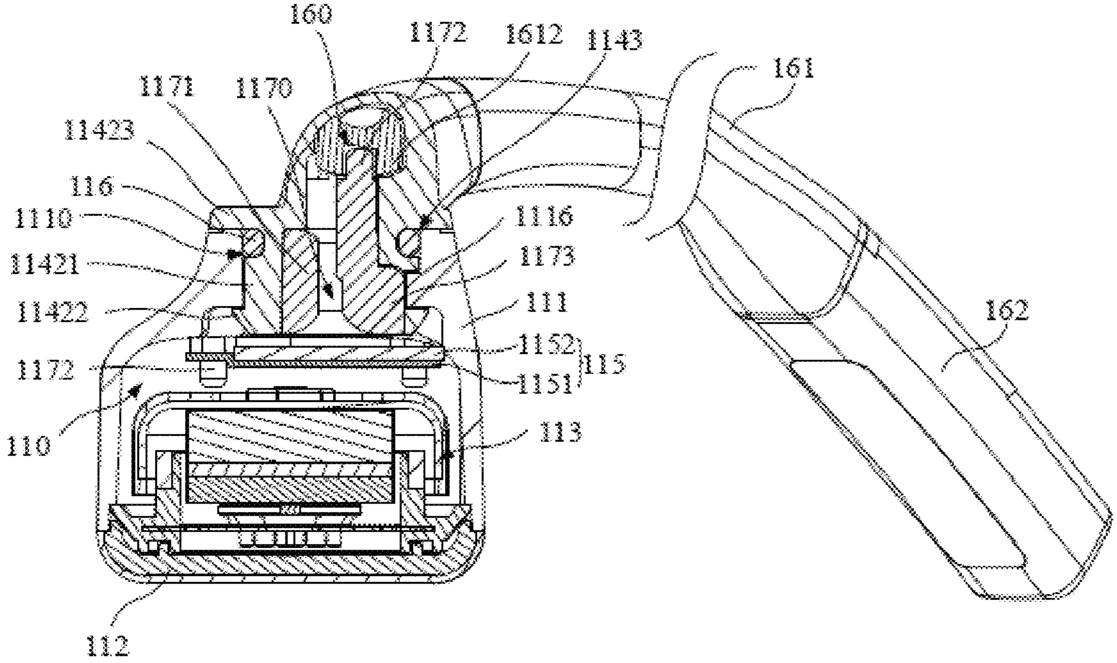
FIG. 9 is a sectional view of A-A as a section line in FIG. 3 according to some embodiments of the present disclosure.

FIG. 9 is a sectional view of A-A as a section line in FIG. 3 according to some embodiments of the present disclosure.

As shown in FIG. 9, the rotation main body 11421 may be embedded in the first through-hole 1110. The first stopping part 11422 and the second stopping part 11423 may abut against two sides of the first loudspeaker housing 111 to effectively restrict the movement of the rotation part 1142 along the axis direction. Specifically, the first stopping part 11422 and the second stopping part 11423 may abut against two sides of the first through-hole 1110 of the first loudspeaker housing 111, respectively, that is, one side of the containment space 110 and the other side of the containment space 110. The first stopping part 11422 and the second stopping part 11423 arranged at two ends of the rotation main body 11421 abutting against two sides of the first loudspeaker housing 111 may effectively restrict the movement of the rotation part 1142 along the axial direction, thereby restricting the rotation part 1142 to rotate in the first through-hole 1110 to enhance the rotational stability.

As shown in FIG. 8 and FIG. 9, in some embodiments, in order to further enhance the rotational stability of the stick microphone assembly 16, the rotation part 1142 may be configured with a damping groove 1143. In some embodiments, the damping groove 1143 may be formed between the first stopping part 11422 and the second stopping part 11423 of the rotation main body 11421 along the circumferential direction. The loudspeaker assembly 11 may include a damping member 116. The damping member 116 may be arranged in the damping groove 1143 and in contact with the inner wall of the first through-hole 1110 to provide the rotation damping to the rotation part 1142 by contact friction. The inner wall of the first through-hole 1110, that is the bottom wall 1112, may surround a part of the first through-hole 1110. In some embodiments, the damping member 116 may be a rubber member, a plastic member, or a silicone member. In some embodiments, the damping member 116 may also be other types of materials. The damping member 116 inserted into the damping groove 1143 that provides the damping to the rotation part 1142 rotating in the first through-hole 1110 may make the rotation of the rotation portion 1142 to be more stable, and enhance the rotation balance and stability of the stick microphone assembly.

In the process of rotating the stick microphone assembly 16, the reliability of the rotation may need to be enhanced except for the rotational stability. If the stick microphone assembly 16 may be rotatable in the same direction without restrictions, the wiring group, or the like, of the stick microphone assembly 16 may be twisted or broken. If the stick microphone assembly 16 is rotatable in the same direction without restrictions, the damping assembly of the rotation member 114 may be more susceptible to fail, resulting in subsequent difficulties to adjust the angles of the stick microphone assembly 16 by the rotation member 114. Therefore, in some embodiments, it may be necessary to restrict the rotation range of the stick microphone assembly 16.

As shown in FIG. 8 and FIG. 9, in some embodiments, the rotation part 1142 may be configured with a limiting groove 1144. A convex block 1116 may be arranged protruding from the inner wall of the first through-hole 1110, and the convex block 1116 may be matched with the limiting groove 1144 to restrict the rotation range of the rotation part 1142.

In some embodiments, the limiting groove 1144 may form between the first stopping part 11422 and the second stopping part 11423 along the circumferential direction of the rotation main body 11421. The limiting groove 1144 and the damping groove 1143 may be arranged at an interval. Specifically, the limiting groove 1144 and the damping groove 1143 may be arranged at an interval along the axial direction of the rotation main body 11421. The limiting groove 1144 may be arranged as the open loop. That is, an angle occupied by the limiting groove 1144 may be less than 360°.

A convex block 1116 may be arranged protruding from the inner wall of the first through-hole 1110. The convex block 1116 may be inserted into the limiting groove 1144. When the rotation part 1142 is rotatable relative to the first loudspeaker housing 111, two ends of the limiting groove 1144 may change the position between the convex block 1116 with the rotation of the rotation part 1142. When the limiting groove 1144 rotates to one end abutting against the convex block 1116, the convex block 1116 may restrict the rotation part 1142 from rotating along the current rotation direction. That is, the convex block 1116 may abut against the two ends of the limiting groove 1144 to restrict the rotation range of the rotation part 1142.

The limiting groove 1144 arranged on the rotation main body 11421 may cooperate with the convex block 1116 arranged on the inner wall of the first through-hole 1110, and the convex block 1116 may abut against the two ends of the limiting groove 1144, which may restrict the rotation range of the rotation part 1142 effectively, and the stick microphone assembly 16 may be rotatable in a certain range without unrestricted rotation in one direction. Thus, the rotation reliability of the stick microphone assembly 16 may be improved, the failure probability of the stick microphone assembly 16 may be reduced, and the service life of the bone conduction earphone 1 may be improved.

As shown in FIG. 8 and FIG. 9, in order to reduce the occurrence of the stick microphone assembly 16 inserted into the first hole segment 11410 to fall off or be pulled out, or the like, the loudspeaker assembly 11 may include a fixing member 117 to fix the stick microphone assembly 16 inserted into the first hole segment 11410, thereby restricting the movement of the stick microphone assembly 16. In some embodiments, a fixing hole 160 may be arranged on one end of the stick microphone assembly 16 that is inserted into the first hole segment 11410. Specifically, the fixing member 117 may include a fixing main body 1171 and a plug-in pin 1172 arranged on one end of the fixing main body 1171. The fixing main body 1171 may be inserted into the second hole segment 11420, and the plug-in pin 1172 may be inserted into the fixing hole 160 to restrict the movement of the stick microphone assembly 16. In some embodiments, the fixing main body 1171 may be configured with a wire-guiding hole 1170 along the length direction. The wire-guiding hole 1170 may be in communication with the second hole segment 11420 and the containment space 110, and the wiring group of the stick microphone assembly 16 may enter the containment space 110 by passing through corresponding wire-guiding hole 1170 on the fixing main body 1171.

Gaps 11424 may be formed at one end of the rotation part 1142 away from the wire-guiding part 1141, and the gaps 11424 may communicate with the second hole segment 11420. The fixing member 114 may further include convex tables 1173 arranged protruding from a periphery of the fixing main body 1171. The convex tables 1173 may be inserted into the gaps 11424 to fill the gaps 11424. The rotation main body 11421 may be accommodated in the second hole segment 11420 stably. In some embodiments, a count of gaps 11424 may be at least two, and the gaps 11424 may divide one end of the rotation part 1142 away from the wire-guiding part 1141 into at least two sub-members 11425 spaced apart from each other along the circumferential direction of the rotation part 1142. That is, the gaps 11424 may penetrate the peripheral side of the rotation main body 11421, and in the circumferential direction of the rotation part 1142, one end of the rotation part 1142 away from the wire-guiding part 1141 may be divided into a corresponding count of sub-members 11425.

The end part of the rotation portion 1142 may be divided into at least two sub-members 11425 by the gaps 11424, so that one end of the rotation part 1142 away from the wire-guiding part 1141 may have a certain elasticity. The difficulty of inserting the rotation part 1142 into the first through-hole 1110 may be reduced, and the assembly efficiency may be improved. At the same time, the convex tables 1143 may be inserted into the gaps 11424, and the structural reliability and strength of the rotation part 1142 may be enhanced by taking advantage of the two complementary approaches.

In some embodiments, the count of gaps 11424 may be two and opposite to each other. The count of convex tables 1173 may be two, correspondingly, and opposite to each other. The two convex tables 1173 may be inserted into the two gaps 11424 so that the fixing member 117 may be supported between the two sub-members 11425. Further, the two convex tables 1173 may be inserted into the two gaps 11424. Therefore, one end of the fixing member 117 and one end of the rotation part 1142 away from the wire-guiding part 1141 may complement with each other to form a complete annular structure.

The second through-hole 1111 may be configured for matching to and plugging in the ear hook assembly 12, and the wiring group of the stick microphone assembly 16 may pass through the ear hook assembly 12 and enter an accommodating space 120 via the second through-hole 1111. The followings are exemplary descriptions of the ear hook assembly 12.

Figure 10:
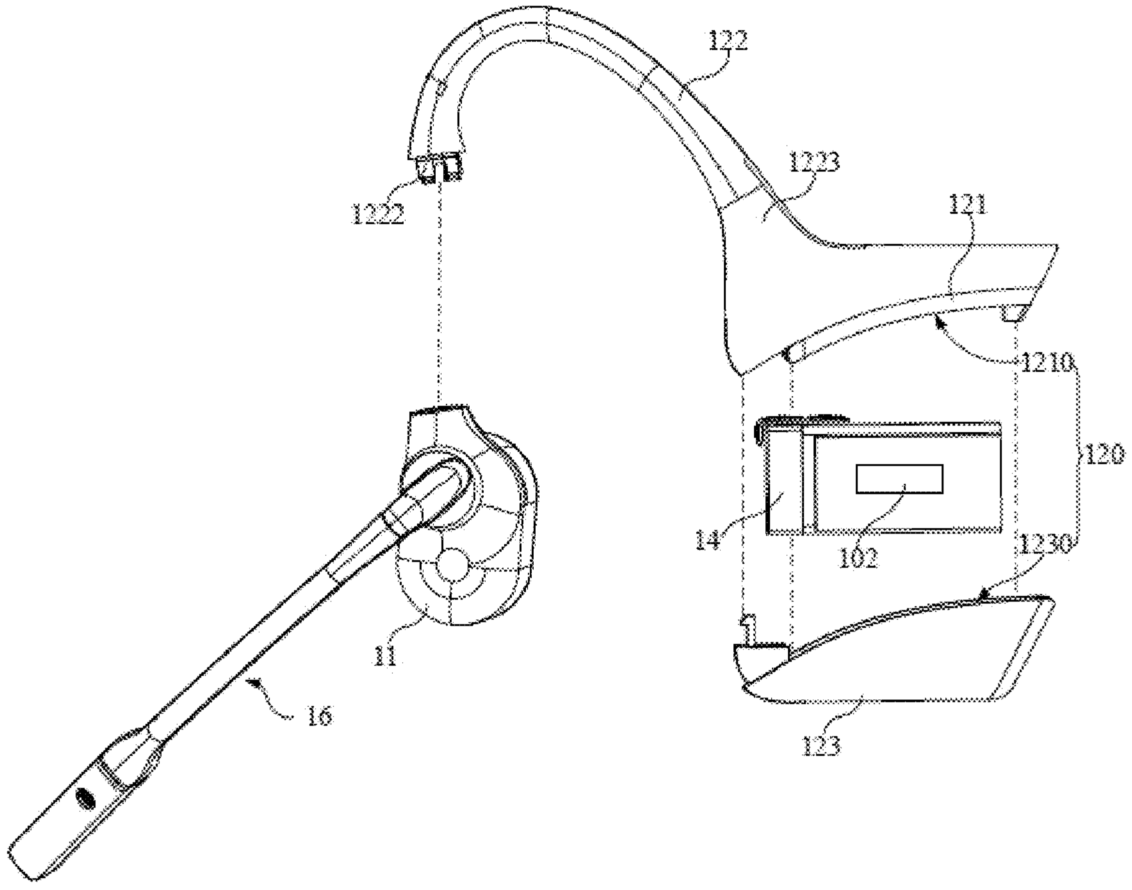
FIG. 10 is an exploded diagram of a structure of an ear hook assembly according to some embodiments of the present disclosure.
Figure 11:
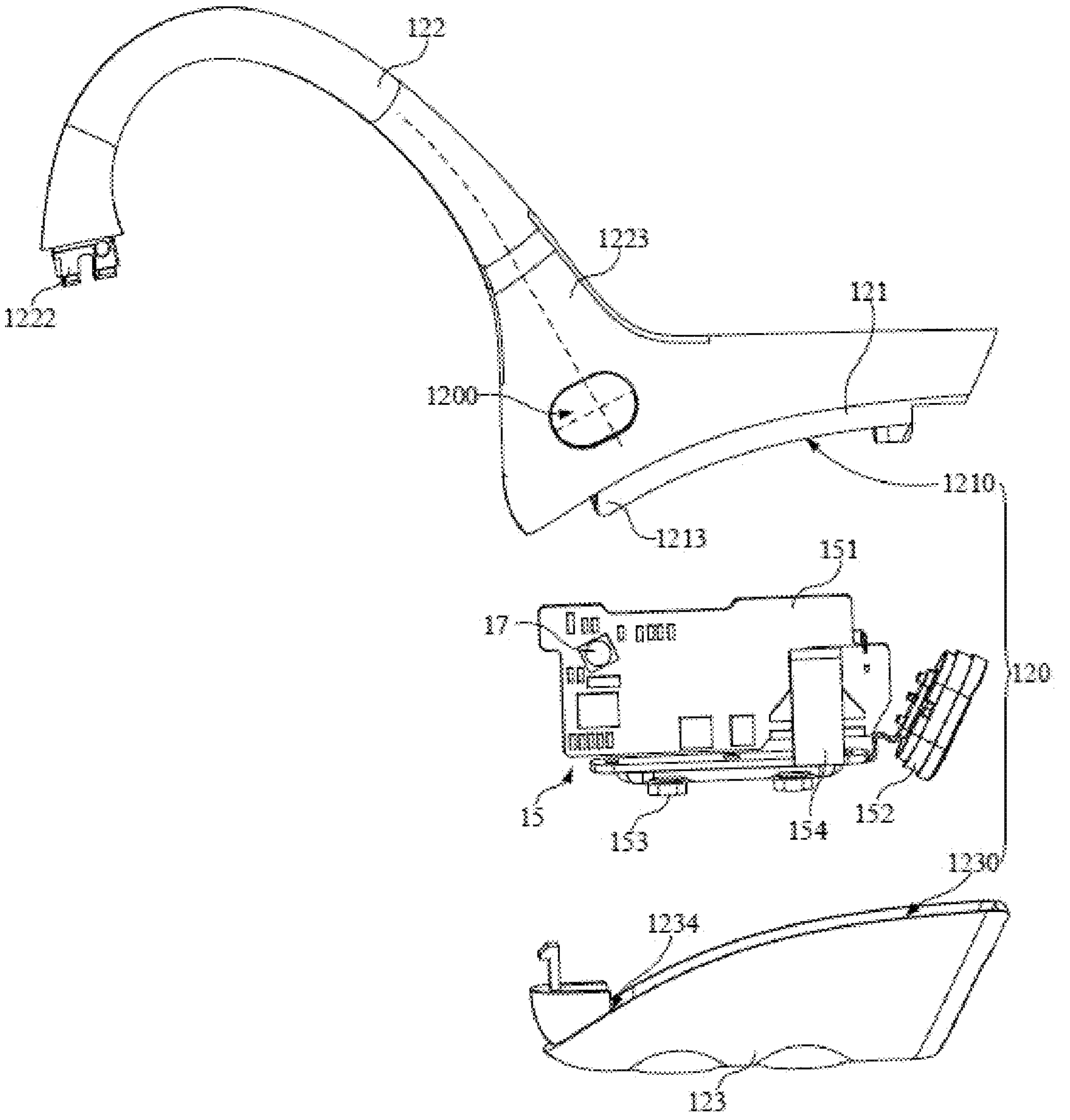
FIG. 11 is an exploded diagram illustrating a structure of an ear hook assembly according to some embodiments of the present disclosure.

FIG. 10 and FIG. 11 are exploded diagrams of a structure of an ear hook assembly according to some embodiments of the present disclosure.

As shown in FIG. 10 and FIG. 11, the ear hook assembly 12 may include a first ear hook housing 121, a connection member 122, and a second ear hook housing 123. One end of the connection member 122 may be connected to the first ear hook housing 121. The other end of the connection member 122 may be connected to the loudspeaker 113. For example, the other end of the connection member 122 may be inserted into the second through-hole 1111 of the first loudspeaker housing 111 to be matched to and plugged in the loudspeaker assembly 11.

The first ear hook housing 121 may include a first sub-accommodating space 1210, and the second ear hook housing 123 may include a second sub-accommodating space 1230. The first sub-accommodating space 1210 and the second sub-accommodating space 1230 may be non-hermetic spaces formed by half-enclosing corresponding housings, which may be spliced together to form a hermetic accommodating space 120. In some embodiments, the accommodating space 120 may be used for accommodating any one or a combination of the battery assembly 14 or the control circuit assembly 15. In some embodiments, the accommodating space 120 of an ear hook assembly 12 may be used to accommodate the battery assembly 14 (e.g., the ear hook assembly 12 shown in FIG. 10). The accommodating space 120 of the other ear hook assembly 12 may be used to accommodate the control circuit assembly 15 (e.g., the ear hook assembly 12 shown in FIG. 11).

As shown in FIG. 10, the battery assembly 14 may include a battery housing (not labeled) and a battery chip arranged in the battery housing (not shown in the figure). The battery chip may be configured to store power. In some embodiments, a first NFC module 102 mentioned in the earphone communication system embodiments in one or more embodiments may be attached to the battery assembly 14. For example, the first NFC module may be attached to the battery housing so that the volume of the bone conduction earphone 1 may be reduced, and the electromagnetic interference or signal interference between the first NFC module 102 and the control circuit assembly 15 may also be reduced.

As shown in FIG. 11, the control circuit assembly 15 may include a circuit board 151, a power supply interface 152, a button 153, an antenna 154, or the like. As shown in FIG. 2, the first Bluetooth module 101 may be integrated into the control circuit assembly 15. The control circuit assembly 15 may also integrate other circuits and elements. For example, the first Bluetooth module 101 may be integrated on the circuit board 151. The sensor assembly 17 may also be integrated on the circuit board 151.

As shown in FIG. 11, taking the sensor assembly 17 including an optical sensor as an example, the first ear hook housing 121 may form a window 1200 for transmitting optical signals of the optical sensor. The window 1200 may be arranged close to the connection member 122, so that when the bone conduction earphone 1 is worn, the window 1200 may attach and close to the position near the root of the user's ear to detect whether the user is wearing the bone conduction earphone 1 sensitively. In some embodiments, the window 1200 may be set up in a shape of a racetrack. In some embodiments, an extension line of a central axis of the connection member 122 and a long axis of the window 1200 may intersect with each other, such as the rough intersecting relationships shown in FIG. 11. The extension line of the central axis of the connection member 122 and the long axis of the window 1200 intersecting with each other may make the window 1200 attach and close to the position near the root of the user's ear effectively. Therefore, the sensitivity and the validity of detection of the sensor assembly 17 may be guaranteed. In some embodiments, the first ear hook housing 121 of the ear hook assembly 12 configured to accommodate the control circuit assembly 15 may form the window 1200 mentioned above.

In some embodiments, the accommodating space 120 may accommodate a combination of the battery assembly 14 or the control circuit assembly 15 directly. Specifically, the two assemblies shown in FIG. 10 and FIG. 11 may be accommodated in the accommodating space 120 at the same time. In some embodiments, the control and battery of the entire bone conduction earphone may be on one side of the bone conduction earphone (the 15 side or the 14 side as shown in FIG. 3), which makes it easier to manufacture and assemble the bone conduction earphone. Such a design may avoid the wiring of the wiring group in the bone conduction earphone 1 between the loudspeaker assembly 11 and the ear hook assembly 12. Therefore, the wire stuck structure such as the first wire stuck part 1224, the joint part 1222, or the like, may not need to be arranged. However, since all the elements are on one side of the bone conduction earphone, a weight balance of the bone conduction earphone, or the like, may need to be redesigned.

Figure 12:
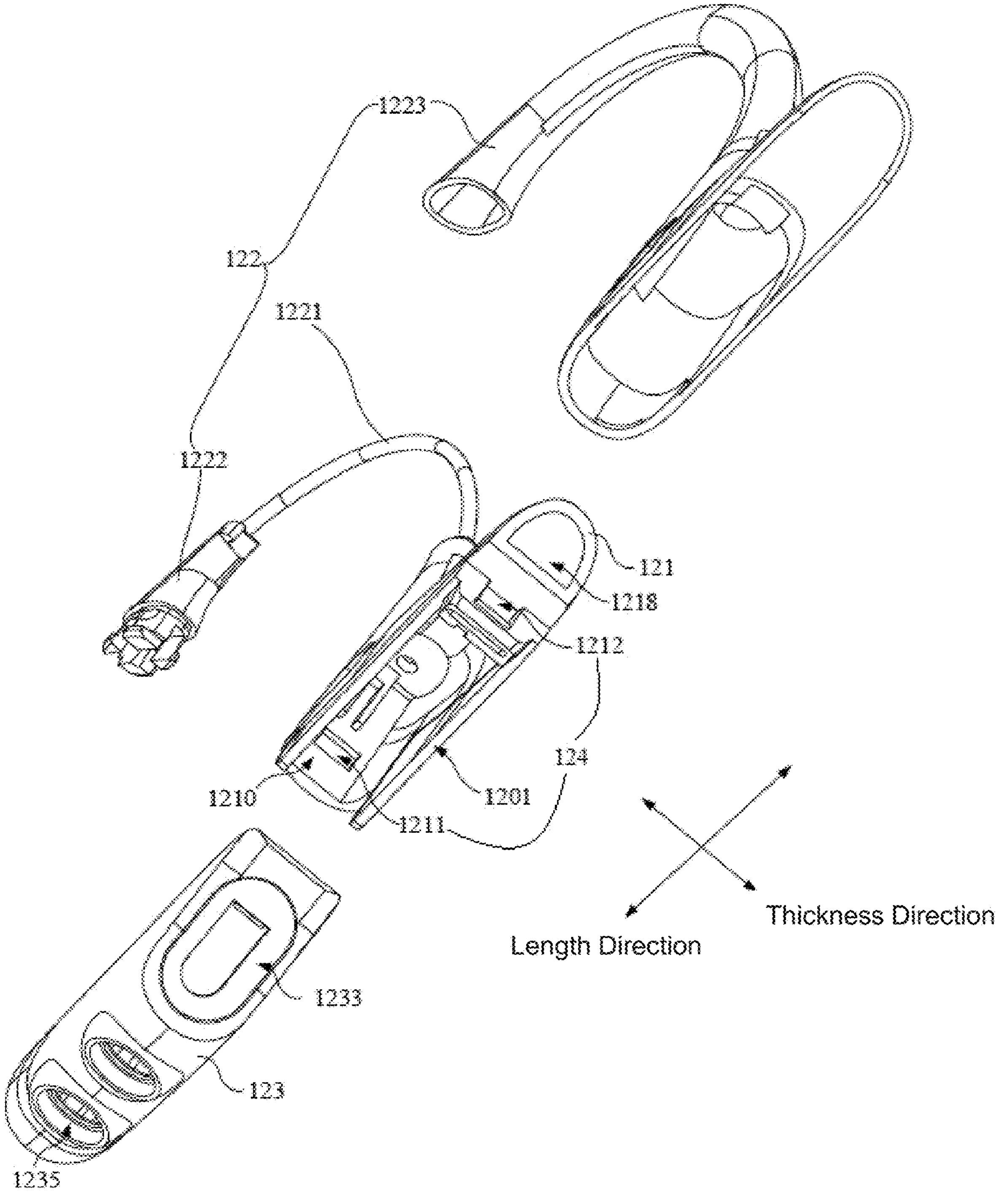
FIG. 12 is a structural diagram illustrating a first ear hook housing and a second ear hook housing according to some embodiments of the present disclosure.
Figure 13:
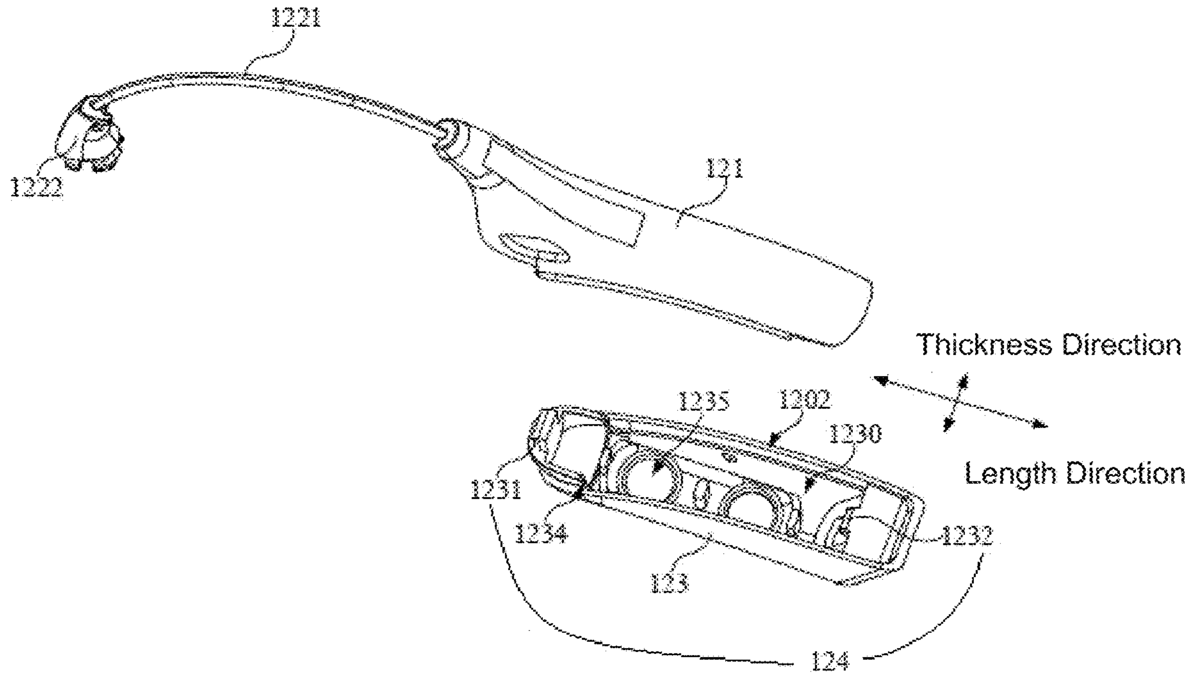
FIG. 13 is a structural diagram illustrating a first ear hook housing and a second ear hook housing according to some embodiments of the present disclosure.
Figure 14:
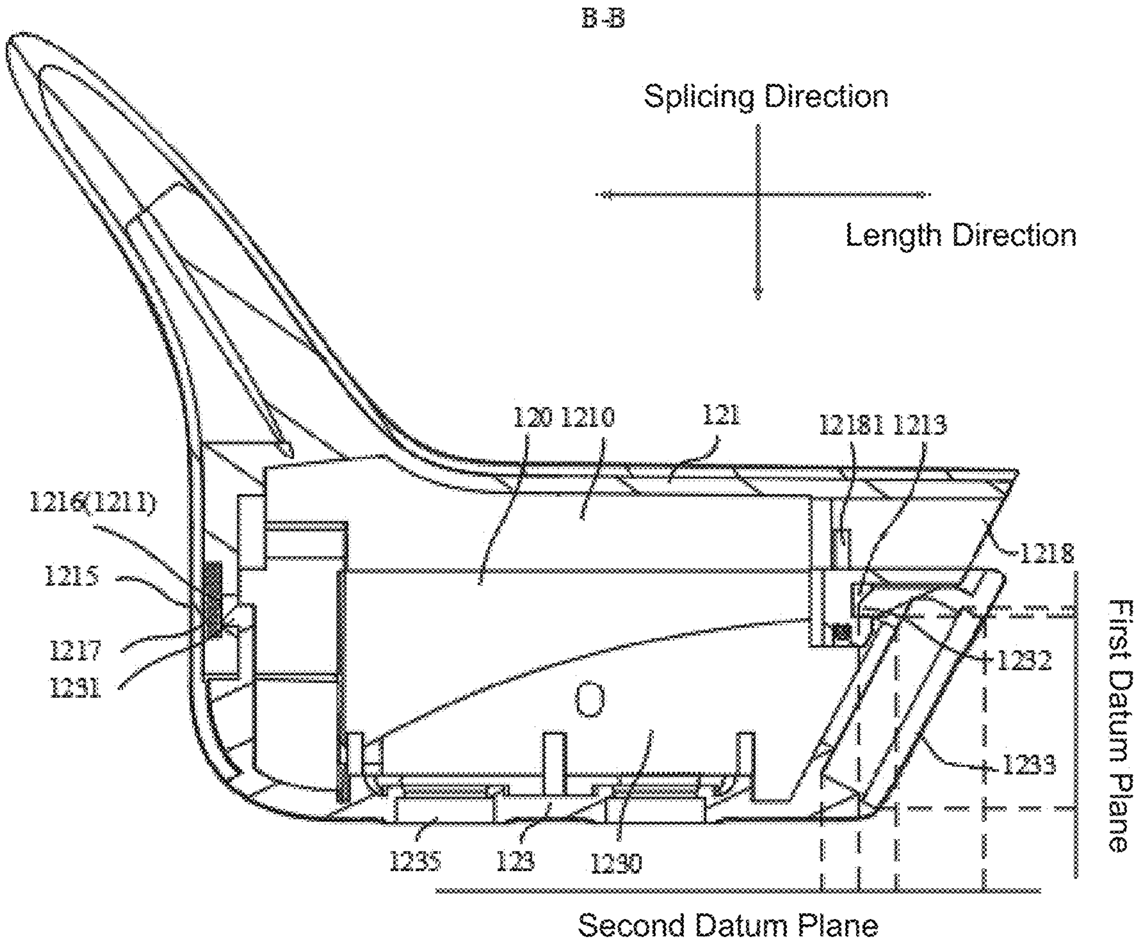
FIG. 14 is a sectional view of B-B as a section line in FIG. 3 according to some embodiments of the present disclosure.
Figure 15:
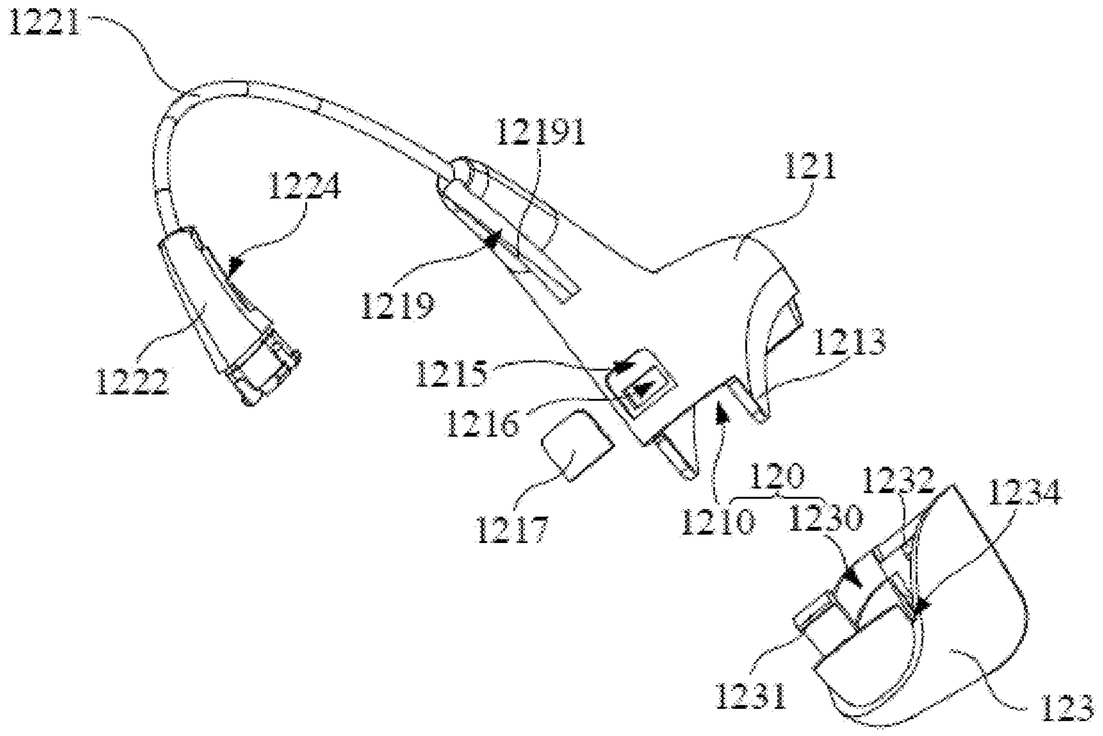
FIG. 15 is a structural diagram illustrating a first ear hook housing and a second ear hook housing according to some embodiments of the present disclosure.
Figure 16:
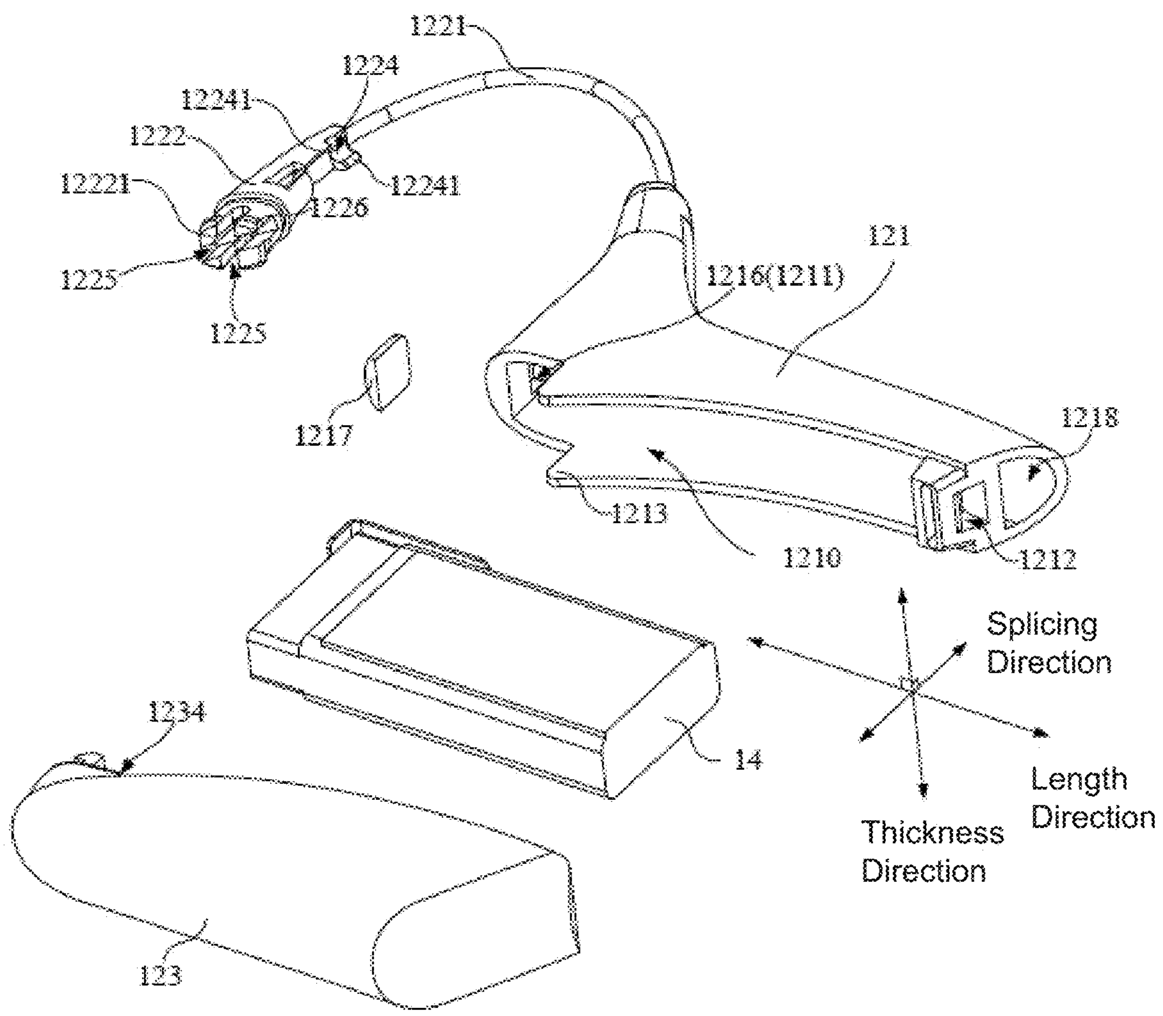
FIG. 16 is an exploded diagram illustrating a structure of an ear hook assembly according to some embodiments of the present disclosure.

In order to specifically describe the specific structure of the ear hook assembly 12, the first ear hook housing and the second ear hook housing of the bone conduction earphone may be described according to FIG. 12 to FIG. 16 of the present disclosure. FIG. 12 is a structural diagram illustrating a first ear hook housing and a second ear hook housing according to some embodiments of the present disclosure. FIG. 13 is another structural diagram illustrating a first ear hook housing and a second ear hook housing according to some embodiments of the present disclosure. FIG. 14 is a sectional view of B-B as a section line in FIG. 3 according to some embodiments of the present disclosure. FIG. 15 is another structural diagram illustrating a first ear hook housing and a second ear hook housing according to some embodiments of the present disclosure. FIG. 16 is another exploded diagram illustrating a structure of an ear hook assembly according to some embodiments of the present disclosure.

As shown in FIG. 12 and FIG. 13, the first ear hook housing 121 and the second ear hook housing 123 may be spliced along a splicing direction perpendicular to the length direction and the thickness direction to form the accommodating space 120. For example, the first ear hook housing 121 may include a first sub-accommodating space 1210, and the second ear hook housing 123 may include a second sub-accommodating space 1230. After the first ear hook housing 121 and the second ear hook housing are spliced, the first sub-accommodating space 1210 and the second sub-accommodating space 1230 may be combined to form the accommodating space 120. In some embodiments, the length direction may refer to the length direction of the accommodating space 120, and the thickness direction may refer to the thickness direction of the accommodating space 120. The length direction and the thickness direction may be referred to the directions labeled in FIG. 12.

For ease of use, the bone conduction earphones are gradually developing towards portability and miniaturization. The ear hook assembly 12 may be configured to accommodate the battery assembly 14, the control circuit assembly 15, the wires, or the like, which often occupies a larger volume of the bone conduction earphones, thereby directly affecting the use of the bone conduction earphones. Therefore, in some embodiments, a first connection assembly 124 may be configured in a form of a block-slot connection. Compared with other structures, the form of the block-slot connection may occupy a small area and the connection may be reliable, which may reduce the volume of the ear hook assembly 12. In some embodiments, the first ear hook housing 121 may be configured with an outer side hole segment and an inner side hole segment communicating with each other in a direction from the outside of the accommodating space 120 to the inside of the accommodating space 120. The inner side hole segment may be designated as the slot, and the volume of the ear hook assembly 12 may be further reduced by arranging the slot and the block structure based on the existing structure. Descriptions regarding the inner side hole segment designated as the slot may be described in FIG. 15.

As shown in FIG. 12 and FIG. 13, the first connection assembly 124 may include a first slot 1211 and a first block 1231. One of the first slot 1211 and the first block 1231 may be arranged on the first ear hook housing 121, the other may be arranged on the second ear hook housing 123. The matched and stuck connection of the first slot 1211 and the first block 1231 may restrict the relative movement of the first ear hook housing 121 and the second ear hook housing 123 in the length direction and the thickness direction. For example, one or more embodiments of the present disclosure are exemplified by the first slot 1211 being arranged on the first ear hook housing 121 and the first block 1231 being arranged on the second ear hook housing 123. It should be understood that the first block and the first slot may also be oppositely arranged on the first ear hook housing 121 and the second ear hook housing 123. That is, the first slot 1211 may be arranged on the second ear hook housing 123, and the first block 1231 may be arranged on the first ear hook housing 121.

As mentioned above, the matched and stuck connection of the first slot 1211 and the first block 1231 may restrict the relative movement of the first ear hook housing 121 and the second ear hook housing 123 in the length direction and the thickness direction. In some embodiments, the first connection assembly 124 may also include other structures different from the first slot 1211 and the first block 1231 to restrict the relative movement of the first ear hook housing 121 and the second ear hook housing 123 in the splicing direction. Specifically, as shown in FIG. 12 and FIG. 13, the first connection assembly 124 may also include a second slot 1212 and a second block 1232 corresponding to the first slot 1211 and the first block 1231, respectively. The second slot 1212 and the second block 1232 may be arranged on the first ear hook housing 121 and the second ear hook housing 123, respectively. The matched and stuck connection of the second slot 1212 and the second block 1232 may restrict the relative movement of the first ear hook housing 121 and the second ear hook housing 123 in the splicing direction.

It should be understood that, compared with other detachable structures, the form of the block-slot connection may occupy a small area and the connection may be reliable, which may reduce the volume of the ear hook assembly 12. It should be noted that the design of the second slot 1212 and the second block 1232 is merely for example, and those skilled in the art may make adaptive changes to the embodiments of the present disclosure on the basis of knowing the implementations of the present disclosure. For example, the second slot 1212 and the second block 1232 may be replaced by connection methods such as riveting, welding, bonding, or the like. As another example, the second slot 1212 and the second block 1232 may be replaced with one or more combinations such as thread connection, pin connection, elastic deformation connection, locking connection, snap connection, plug connection, or the like. Such changes may be still within the protection scope of the present disclosure.

The first slot 1211 and the second slot 1212 may be arranged in various ways as follows.

As shown in FIG. 12, in some embodiments, the first ear hook housing 121 may be configured with the first slot 1211 and the second slot 1212 arranged at an interval along the length direction with the same or similar opening directions. For example, the openings of the first slot 1211 and the second slot 1212 may face the same direction. The second ear hook housing 123 may be configured with the first block 1231 and the second block 1232 protruding along the length direction with the same or similar extending direction. For example, the first block 1231 and the second block 1232 may be spaced apart in the length direction, and the protruding direction of the first block 1231 and the second block 1232 may be the same, thereby facing the same direction. The first block 1231 and the second block 1232 may be inserted into the first slot 1211 and the second slot 1212, respectively, in the same direction.

In some embodiments, the first slot 1211 and the second slot 1212 may also be arranged opposite to each other along the length direction of the first ear hook housing 121. As shown in FIG. 12, the first slot 1211 and the second slot 1212 may be arranged at two ends of the first ear hook housing 121 along the length direction, respectively. When the first slot 1211 and the second slot 1212 are arranged at the two ends of the first ear hook housing 121, the shape of the entire first ear hook housing 121 may tend to be flat, so that the volume of the first ear hook housing 121 may be small.

In some embodiments, the first slot 1211 and the second slot 1212 may also be arranged opposite to each other in the thickness direction of the first ear hook housing 121, and the second ear hook housing 123 may be configured with corresponding slots at corresponding positions. Since the thickness direction of the first ear hook housing 121 needs to add a connection mechanism (e.g., a slot, a block, etc.), which may increase the thickness of the first ear hook housing 121, thereby increasing the volume of the first ear hook housing 121.

In some embodiments, the first ear hook housing 121 may be configured with a plurality of blocks (a count of the blocks may not be limited to 2, such as 3, 4, 6 . . . ) arranged at intervals, and the second ear hook housing 123 may be configured with a corresponding count of slots at corresponding positions (or a ring groove may be directly arranged on the edge of the second ear hook housing 123). The first ear hook housing 121 and the second ear hook housing 123 may be integrally connected through the matching of the plurality of blocks and the slot (the ring slot).

In some embodiments, the first slot 1211 and the second slot 1212 may be arranged on two sides (i.e., the first slot 1211 and the second slot 1212 may be arranged at the ends of the first ear hook housing 121) of the first ear hook housing 121 along the length direction, respectively. In some embodiments, the shape of the first ear hook housing 121 may tend to be flat, and the volume may be small, which is comfortable to wear. In addition, the first slot 1211 and the second slot 1212 may be arranged at two ends of the first ear hook housing 121, respectively, and the connection may be stable and reliable.

In some embodiments, the opening direction of the first slot 1211 and the second slot 1212 may face the accommodating space 120 (the direction of the slot shown in FIG. 12). The second ear hook housing 123 may be configured with a first block 1231 and a second block 1232 protruding and extending in the same direction along the length direction. The protruding directions of the first block 1231 and the second block 1232 may be the same, so that the first block 1231 and the second block 1232 may be inserted into the first slot 1211 and the second slot 1212 along the same direction, respectively.

In some embodiments, the opening direction of the first slot 1211 and the second slot 1212 may be opposite. As shown in FIG. 12, the opening direction of the first slot 1211 may face the first sub-accommodating space 1210, and the opening direction of the second slot 1212 may deviate from the first sub-accommodating space 1210. That is, the opening direction of the first slot 1211 may face the accommodating space 120, and the opening direction of the second slot 1212 may deviate from the accommodating space 120.

It should be understood that the first block 1231 and the second block 1232 may also be designed similarly to the first slot 1211 and the second slot 1212. As shown in FIG. 13, the extending direction of the first block 1231 may deviate from the accommodating space 120, and the extending direction of the second block 1232 may face the accommodating space 120. That is, the extending direction of the first block 1231 may deviate from the second sub-accommodating space 1230, and the extending direction of the second block 1232 may face the second sub-accommodating space 1230. In some embodiments, the first block 1231 may be arranged on one side of the second ear hook housing 123 near the ear hook connection member 122, and the second block 1232 may be arranged on one side of the second ear hook housing 123 away from the connection member 122. Since the second block 1232 protrudes and extends to the inside of the accommodating space 120, compared with protruding and extending to the outside of the accommodating space 120, it may not be necessary to occupy an additional space, and corresponding space may be saved. The second slot 1212 may be arranged on the front of the extending direction of the second block 1232 when the second block is matched to the second slot 1212. The second block 1232 matched and inserted into the second slot 1212 may reduce the volume of the ear hook assembly 12.

In some embodiments, the opening direction of the first slot 1211 may face the accommodating space 120. If the first slot 1211 is formed directly in the first sub-accommodation space 1210, a pattern drawing direction forming the first sub-accommodation space 1210 and a pattern drawing direction forming the first slot 1211 may interfere with each other during the process of using corresponding molds to form the first sub-accommodation space 1210 and the first slot 1211. Since the pattern drawing direction of the first slot 1211 is in the first sub-accommodating space 1210, which may also conflict with the pattern drawing directions of other structures, it may bring great difficulties to the production. Based on the technical difficulties mentioned above, the outer side hole segment 1215 and the inner side hole segment 1216 are designed to reduce production and manufacturing difficulties. Descriptions regarding the outer side hole segment 1215 and the inner side hole segment 1216 may be found in FIG. 15.

FIG. 14 is a sectional view of B-B as a section line in FIG. 3 according to some embodiments of the present disclosure. In FIG. 14, the first block 1231 may be inserted into the first slot 1211, and the second block 1232 may be inserted into the second slot 1212 to restrict the relative movement of the first ear hook housing 121 and the second ear hook housing 123 in the length direction and the thickness direction.

It should be noted that, for the embodiment in which the extending directions of the first block 1231 and the second block 1232 are opposite, the first block 1231 and the second block 1232 may protrude in opposite directions, respectively, which may inevitably cause an increase in the additional space occupied by the first block 1231 and the second block 1232. The first slot 1211 and the second slot 1212 may also need to increase the distance in the length direction in order to enable the first block 1231 and the second block 1232 to be inserted into the first slot 1211 and the second slot 1212, respectively, so that the first block 1231 and the second block 1232 may be covered. Therefore, as shown in FIG. 14, the first slot 1211 and the second slot 1212 with the same opening directions, and the first block 1231 and the second block 1232 with the same extending directions may be selected to reduce the volume occupied by the matching between the first block 1231 and the first slot 1211 and the matching between the second block 1232 and the second slot 1212, thereby reducing the volume of the ear hook assembly 12.

In some embodiments, in order to strengthen the structural stability of the ear hook assembly 12 and restrict the relative movement of the first ear hook housing 121 and the second ear hook housing 123 in the length direction, a splicing edge and/or a blocking part may be arranged.

As shown in FIG. 14, the first ear hook housing 121 may be configured with a splicing edge 1201, and the second ear hook housing 123 may be configured with a splicing edge 1202. The splicing edge 1201 of the first ear hook housing 121 and the splicing edge 1202 of the second ear hook housing 123 may be matched to each other to restrict the relative movement of the first ear hook housing 121 and the second ear hook housing 123 along the length direction. In some embodiments, the first ear hook housing 121 and the second ear hook housing 123 being spliced may refer to the splicing edge 1201 of the first ear hook housing 121 may be substantially in contact with and connected to the splicing edge 1202 of the second ear hook housing 123.

In some embodiments, the splicing edge 1201 of the first ear hook housing 121 may refer to an edge of the first ear hook housing 121 toward one side of the second ear hook housing 123 splicing with the second ear hook housing 123, such as the splicing edge 1201 shown in FIG. 12. The splicing edge 1202 of the second ear hook housing 123 may refer to an edge of the second ear hook housing 123 toward one side of the first ear hook housing 121 splicing with the first ear hook housing 121, such as the splicing edge 1202 shown in FIG. 13. For example, shapes of the splicing edge 1201 of the first ear hook housing 121 and the splicing edge 1202 of the second ear hook housing 123 may be matched to each other, which may fit together or complement each other, thereby forming a stable matching structure and restricting the relative movement along the length direction.

The splicing edge 1201 of the first ear hook housing 121 and the splicing edge 1202 of the second ear hook housing 123 may be fitted to each other, so that additional structures such as buckles, protrusions, or the like, may not need to be arranged. The structure of the ear hook assembly 12 may be more compact and the volume of the ear hook assembly 12 may also be reduced. The displacement in the length direction may be restricted through the fitness of the splicing edge 1201 and the splicing edge 1202, so that the splicing of the first ear hook housing 121 and the second ear hook housing 123 may be more stable and the structure may be more reliable. The fitness of the splicing edges may refer to the splicing edges being coupled and complementary to each other to form a stable matching structure. In some embodiments, the splicing edge may have a certain height, for example, 1 mm. The splicing edges with a certain height may be connected with each other when the first ear hook housing 121 and the second ear hook housing 123 are spliced together, so as to improve the tightness of the accommodating space 120. Therefore, the contamination of the contents (e.g., the control circuit assembly 15 or the battery assembly 14) in the accommodating space 120 by dust, moisture, and other sundries may be reduced, and the service life of the electronic elements of the contents may be improved.

Since the main materials of the first ear hook housing 121 and the second ear hook housing 123 are materials with a certain strength (e.g., PC, PA, ABS plastic, etc.), the matching of the splicing edge 1201 and the splicing edge 1202 to each other may propose a higher precision requirement for the manufacture of the components. In order to reduce the requirement on the manufacturing precision of the components, at least one of the splicing edge 1201 and the splicing edge 1202 may be made of a material with certain elasticity (e.g., a silicone or resin material with certain elasticity). For example, if the original splicing edge 1201 is designed to be ABS plastic with a height of 1 mm, the splicing edge 1201 may be replaced with silicone or resin with a height of 1 mm. In some embodiments, when the first ear hook housing 121 and the second ear hook housing 123 are spliced together, the splicing edge 1201 and the splicing edge 1202 may be compressed and fitted together under the driving of the first connection assembly 124. It should be understood that, the elastic design of the splicing edges may make the matching of the splicing edges have a certain concession. Even if there is a certain deviation in the accuracy of the components manufacturing, the components may be installed and used smoothly, thereby reducing the requirements for the accuracy of the components.

In some embodiments, the splicing edge 1201 and the splicing edge 1202 may also be designed as an interference fit. Specifically, the height of the elastic edge may be slightly greater than the height of the original splicing edge. For example, the original splicing edge 1201 may be designed to be ABS plastic with a height of 1 mm, which may be replaced with silicone or resin with a height of 1.2 mm. In some embodiments, when the first ear hook housing 121 and the second ear hook housing 123 are spliced together, the splicing edge 1201 may be squeezed to form the interference fit. Edges with the interference fit may have a better sealing effect, which may further reduce the contamination of the contents (e.g., the control circuit assembly 15 or the battery assembly 14) in the accommodating space 120 by dust, moisture, and other sundries and increase the service life of electronic components. In some embodiments, the splicing edge 1201 of the first ear hook housing 121 may further include a first blocking part 1213, and the splicing edge 1202 of the second ear hook housing 123 may further include a second blocking part 1234. The first blocking part 1213 may be matched to the second blocking part 1234 to restrict the relative movement of the first ear hook housing 121 and the second ear hook housing 123 along the length direction. As shown in FIG. 13, the first blocking part 1213 may be an opening formed on the splicing edge 1201 of the first ear hook housing 121, and the second blocking part 1234 may be a convex part formed on the splicing edge 1202 of the second ear hook housing 123. The shape of the opening part and the shape of the convex part may be matched to each other, so that the splicing edge 1201 of the first ear hook housing 121 and the splicing edge 1202 of the second ear hook housing 123 may be complementary to restrict the relative movement in the length direction.

Based on the detailed descriptions mentioned above, the stable splicing structure between the first ear hook housing 121 and the second ear hook housing 123 may ensure the sealing of the accommodating space 120, so that the battery assembly 14 and the control circuit assembly 15 in the accommodating space 120 may be protected.

FIG. 15 is another structural diagram illustrating a first ear hook housing and a second ear hook housing according to some embodiments of the present disclosure.

As shown in FIG. 15, the first ear hook housing 121 may be configured with an outer side hole segment 1215 and an inner side hole segment 1216 communicating with each other in a direction from the outside of the accommodating space 120 to the inside of the accommodating space 120. That is, the opening direction of the outer side hole segment 1215 may be away from the accommodating space 120, and the opening direction of the inner side hole segment 1216 may face the accommodating space 120. The outer side hole segment 1215 may communicate with the inner side hole segment 1216. The outer side hole segment 1215 may be filled with a filling member 1217. The filling member 1217 may be a rubber member. For example, the filling member may be a hard glue. When the outer side hole segment 1215 is filled and blocked, the inner side hole segment 1216 may be configured as the first slot 1211, and the opening direction of the inner side hole segment 1216 may face the accommodating space 120 to be matched to the first block 1231.

The cross-sectional area of the outer side hole segment 1215 perpendicular to the connection direction of the inner side hole segment 1215 and the inner side hole segment 1216 may be greater than the cross-sectional area of the inner side hole segment 1216 perpendicular to the connection direction of the outer side hole segment 1215 and the inner side hole segment 1216. Since the cross-sectional area corresponding to the outer side hole segment 1215 is greater than the corresponding cross-sectional area of the inner side hole segment 1216, it may be convenient to fill the filling member 1217 in the outer side hole segment 1215, thereby having a better blocking effect and forming the first slot 1211 quickly.

In order to better reduce the volume of the ear hook assembly 12, the positions of the components in the accommodating space 120 may be designed so that the accommodating space 120 may be effectively compressed, and the volume of the ear hook housing may be reduced. If a power plug-in hole 1233 of the bone conduction earphone 1 may be arranged on one side of the second ear hook housing 123 away from the bottom wall 1112 of the first ear hook housing 121, the volume of the ear hook assembly 12 may be increased. In order to effectively reduce the volume of the ear hook assembly 12, the power plug-in hole 1233 may be arranged on the sidewall 1113 of the second ear hook housing 123 away from the connection member 122, which is described in detail as follows:

As shown in FIG. 12 to FIG. 14, part of the second ear hook housing 123 far from the connection member 122 may be configured with the power plug-in hole 1233. The power plug-in hole 1233 may communicate with the accommodating space 120, and the power plug-in hole 1233 may be configured to accommodate a power supply interface 152. In some embodiments, the second ear hook housing 123 may include a housing bottom part and a housing side part, and the housing side part may surround and connect the housing bottom part to form a second sub-accommodating space 1230. A side edge of the housing side part away from the housing bottom part may be the splicing edge 1202 spliced with the first ear hook housing 121. The power plug-in hole 1233 may be arranged on the housing side part, communicating with the second sub-accommodating space 1230, that is, communicating with the accommodating space 120.

As shown in FIG. 14, the second block 1232 may be arranged close to the power plug-in hole 1233. That is, the second block 1232 may be arranged protruding from the part of the housing of the second ear hook housing 123 away from the connection member 122, and may face the inside of the accommodating space 120. In some embodiments, the second block 1232 may be closer to the accommodating space 120 compared with the power plug-in hole 1233. That is, the second block 1232 may be closer to the connection member 122 compared with the power plug-in hole 1233.

In some embodiments, the projections of the second block 1232 and the power plug-in hole 1233 on a first reference plane perpendicular to the length direction may overlap each other. In some embodiments, overlapping each other may include partial overlap (e.g., the overlapping part is a part of the projection of the second block 1232, that is, a part of the projection of the power plug-in hole 1233), and also may include overall overlap (e.g., the projection of the second block 123 completely falls into the projection of the power plug-in hole 1233). In some embodiments, taking the plane perpendicular to the length direction as the first reference plane, the projection of the second block 1232 on the first reference plane may be located in the projection of the power plug-in plane 1233 on the first reference plane, that is, ranges of two projections may overall overlap each other. The positions of the second block 1232 and the power plug-in hole 1233 may make the structure of the second ear hook housing 123 to be compact, and the volume of the ear hook housing assembly 12 may be reduced without affecting the installation of the power supply interface 152.

In some embodiments, the projections of the second block 1232 and the power plug-in hole 1233 on a second reference plane perpendicular to the splicing direction may overlap each other. Overlapping each other described herein may also include partial overlap and overall overlap. In some embodiments, taking the plane perpendicular to the splicing direction as the second reference plane, the projection of the second block 1232 on the second reference plane may also be located in the projection of the power plug-in hole 1233 on the second reference plane, that is, ranges of two projections may also overlap. The arrangement of the structures of the second block 1232 and the power plug-in hole 1233 may be compact no matter in the splicing direction or the length direction. The space occupied by the power plug-in hole 1233 and the second block 1232 may be saved to improve the compact of the structure of the ear hook assembly 12.

The bone conduction earphone 1 may be used in the producing and manufacturing field or the like, and there may be great requirements for the control experience of the bone conduction earphone 1. The power plug-in hole 1233 arranged at the part of the housing of the second ear hook housing 123 away from the connection member 122 may improve the control experience of the bone conduction earphone 1, and the reasons may be as follows.

The bone conduction earphone 1 generally may have a volume button, or the like. A buttonhole 1235 or the like, and the power plug-in hole 1233 corresponding to the button 153 may be generally arranged on the bottom part of the second ear hook housing 123, that is, the second ear hook housing 123 may be away from a part of the housing of the first ear hook housing 121. Since the area of the bottom part of the housing is relatively limited, the buttonhole 1235 and the power plug-in hole 1233 may be compact. The buttonhole 1235 and the power plug-in hole 1233 may occupy as little space as possible. In some application scenarios, a wearer may wear workmanship, gloves, or the like. The buttonhole 1235 may be smaller, and the arrangement may be too compact, which may cause the wearer's control experience to decline and may easily cause mishandling. The power plug-in hole 1233 may not be arranged on the bottom part of the housing, and the power plug-in hole 1233 may be arranged on the side part of the housing, so that the button-hole 1235 may be designed larger, and the arrangement may be more loosely, which may be convenient for the user to operate and reduce the occurrence of the mishandling.

In addition, based on the design of the power plug-in hole 1233, if the second block 1232 is arranged close to the power plug-in hole 1233 on the second ear hook housing 123 and faces the top position of the first ear hook housing 121 (such as a table area connecting the second block 1232 shown in FIG. 13, that is, the second block 1232 may be regarded as formed by extending inward from the table area to the second sub-accommodating space 1230), the space of a plug-in hole 1218 of the first ear hook housing 121 may be squeezed, which in turn may affect the ear hook assembly 12 being matched to and plugged in the rear hook 13. The second block 1232 may need to occupy an additional space so that the first ear hook housing 121 and the second ear hook housing 123 may occupy a large space in the splicing direction, which may not be compact enough. Therefore, in one or more embodiments of the present disclosure, the power plug-in hole 1233 may be arranged on the bottom part of the housing of the second ear hook housing 123, and the structure between the second block 1232 and the power plug-in hole 1233 may be arranged based on the projection relationship mentioned above so that the structure of the second ear hook housing 123 may be more compact in the splicing direction. The second block 1232 may extend toward the inside of the accommodating space 120, and the size of the ear hook housing 12 may be miniaturized without occupying additional spaces.

In some embodiments, the power plug-in hole 1233 may also be eliminated, and wireless charging technology may be used instead. For example, wireless charging standards such as QI standards, PowerMATRSALLIANCE standards, A4WP standards, iNPOFi technology, Wi-PO technology, or the like, may be used. The battery assembly 14 may be charged without the power plug-in hole 1233. The volume of the ear hook housing 12 may be further miniaturized, and the tightness of the accommodating space 120 may be improved.

In some embodiments, in order to reduce the failure rate of the bone conduction earphone 1, it may be not only necessary to ensure the stability of the structure, but also need to ensure the stability of the electrical connection. The wiring group may be routed between the loudspeaker assembly 11 and the ear hook assembly 12, and the stability of the route may be related to the reliability of the bone conduction assemblies. In order to improve the reliability of the wiring, the ear hook assembly 12 may be configured with a corresponding wire stuck structure to ensure the stability of the wires when the wiring group passes through the ear hook assembly 12. Details may refer to the following descriptions.

The connection member 122 may include an ear hook elastic metal filament 1221, and a joint part 1222 connected to one end of the ear hook elastic metal filament 1221. In order to protect the ear hook elastic metal filament 1221, the connection member 122 may also include an ear hook elastic cover layer 1223 (as shown in FIG. 12) at least covering the periphery of the ear hook elastic metal filament 1221. In some embodiments, the ear hook housing elastic metal filament 1221 may further cover the first ear hook housing 121. The joint part 1222 may be configured to be matched and connected to the loudspeaker assembly 11. The other end of the ear hook elastic metal filament 1221 may be connected to the first ear hook housing 121.

FIG. 16 is another exploded diagram illustrating a structure of an ear hook assembly according to some embodiments of the present disclosure.

As shown in FIG. 15 and FIG. 16, the joint part 1222 may include a first wire stuck part 1224, and the first ear hook housing 121 may include a second wire stuck part 1219. The wiring group leading from the loudspeaker assembly 11 may enter the accommodating space 120 via the first wire stuck part 1224 and the second wire stuck part 1219 sequentially. The first wire stuck part 1224 and the second wire stuck part 1219 may be configured to stuck and stop the wiring group in the radial direction of the wiring group, so that the shaking of the wiring group in the radial direction may be reduced.

The wiring group stuck and stopped by the first wire stuck part 1224 and the second wire stuck part 1219 may be an additional member such as an auxiliary titanium wire used during the preparation of the ear hook assembly 12, or the like. Specifically, during the preparation of ear hook assembly 12, the lead channel may be formed in the ear hook elastic cover layer 1223 using the auxiliary titanium wire. Therefore, the auxiliary titanium wire may be led to pass through the first wire stuck part 1224 and the second wire stuck part 1219 sequentially and enter the accommodating space 120. After the preparation is completed, the auxiliary titanium wire may be drawn out to form a lead channel of the containment space 110 and the accommodation space 120. The first wire stuck part 1224 and the second wire stuck part 1219 may keep the stability of the auxiliary titanium wire to reduce the shake of the auxiliary titanium wire, thereby enabling the glue position to be more stable.

In some embodiments, the lead channel and the ear hook elastic metal filament 1221 may be arranged in parallel in the ear hook elastic cover layer 1223.

The wiring group stuck and stopped by the first wire stuck part 1224 and the second wire stuck part 1219 may be a wiring group used for electrical connection and led after forming the lead channel. That is, the wiring group led by the loudspeaker assembly 11 may enter the accommodating space 120 via the first wire stuck part 1224 and the second wire stuck part 1219. It should be understood that the shake of the wiring group may need to be reduced before entering the lead channel and after entering the lead channel so that the lead efficiency may be improved. In addition, since the ear hook assembly 12 is used to hang on a human ear, thus the ear hook assembly 12 may generally be arc-shaped. The wiring group passing through the ear hook assembly 12 may tend to shake, move, or the like, thus the first wire stuck part 1224 and the second wire stuck part 1219 may reduce the shaking of the wiring group.

Specifically, the ear hook elastic cover layer 1223 may be configured with a lead channel (not shown in the figures). The wiring group led by the loudspeaker assembly 11 may enter the accommodating space 120 via the first wire stuck part 1224, the lead channel, and the second wire stuck part 1219 in sequence. In some embodiments, the loudspeaker assembly 11 may also be connected with the stick microphone assembly 16, and the wiring group led by the loudspeaker assembly 11 may include the wiring group of the loudspeaker 113 and the wiring group of the stick microphone assembly 16. If the loudspeaker assembly 11 is not connected to the stick microphone assembly 16, the wiring group led by the loudspeaker assembly 11 may include the wiring group of the loudspeaker 113.

In some embodiments, the first wire stuck part 1224 and the second wire stuck part 1219 may be arranged at the joint part 1222 and the first ear hook housing 121, respectively. On the one hand, the movement of the auxiliary titanium wire relative to the first ear hook housing 121 and the joint part 1222 may be stuck and stopped during the preparation process to make the glue position of ear hook assembly 12 be more uniform and improve the good product rate of the ear hook assembly 12, on the other hand, the movement of the wiring group in the radial direction may also be stuck and stopped, thereby reducing the shake generated by the wiring group so that the leading efficiency of the wiring group may be more efficient. The structure of the wiring group in the actual product may be more stable, and the stability of the electrical connection may be guaranteed.

In some embodiments, the first wire stuck part 1224 may have two first sub-wire stuck parts 12241 arranged at intervals in the thickness direction. As shown in FIG. 16, the two first sub-wire stuck parts 12241 may be staggered from each other in the length direction of the wiring group. The two first sub-wire stuck parts 12241 may stuck and stop the wiring group in the thickness direction when the wiring group passes between the two first sub-wire stuck parts 12241, which in turn may restrict the movement of the wiring group in the thickness direction. In some embodiments, the extending lengths of the two first sub-wire stuck parts 12241 may be different in the length direction of the wiring group.

The second wire stuck part 1219 may have two second sub-wire stuck parts 12191 arranged at intervals in the thickness direction, and the two second sub-wire stuck parts 12191 may be arranged opposite relatively. The two second sub-wire stuck parts 12191 may stuck and stop the wiring group in the thickness direction when the wiring group passes between the two second sub-wire stuck parts 12191, which in turn may restrict the movement in the thickness direction.

In some embodiments, the first wire stuck part 1224 may be formed recessed on the joint part 1222, and the second wire stuck part 1219 may be formed recessed on the first ear hook housing 121 so that the wiring group may be seen in the first wire stuck part 1224 and the second wire stuck part 1219, which may reduce the distance when the wiring group is led and passes through an invisible area to improve the leading efficiency.

In some embodiments, in order to facilitate the joint part 1222 to be inserted into the second through-hole 1111 of the first loudspeaker housing 111, and enhance the connection stability between the joint part 1222 and the second through-hole 1111, as shown in FIG. 16, an end part 12221 of the joint part 1222 may form two through-grooves 1225 crossing each other to divide the end part 12221 into four sub-end parts. The end part 12221 may be divided into four sub-end parts by the two through-grooves 1225 crossing each other so that the elasticity of the end part 12221 may be improved and the four sub-end parts may be squeezed and elastically recovered. When the joint part 1222 is inserted into the second through-hole 1111, the four sub-end parts may be squeezed and close to each other, so that the sub-end parts 12221 may be smaller, and the joint part 1222 may be easy to be inserted into the second through-hole 1111.

A protrusion 1226 may be arranged protruding from the periphery of the sub-end parts. The joint part 1222 may be inserted into the loudspeaker assembly 11 and the protrusion 1226 may be stuck and stopped by the loudspeaker assembly 11 to restrict the movement of the joint part 1222 from moving away from the loudspeaker assembly 11. Specifically, after the joint part 1222 is inserted into the second through-hole 1111, the four sub-end parts may be elastically recovered, which may cause the protrusion 1226 on the periphery of the sub-end parts to be stuck and stopped by the loudspeaker assembly 11. The connection reliability of the ear hook assembly 12 and the loudspeaker assembly 11 may be improved.

Specifically, after the joint part 1222 is inserted into the second through-hole 1111, the protrusion 1226 may be arranged in the containment space 110, and the protrusion 1226 may be stuck and stopped at the edge of the connection between the second through-hole 1111 and the containment space 110.

The material of the ear hook elastic metal filament 1221 may be spring steel, titanium, or other metallic or non-metallic materials. The material of the ear hook elastic cover layer 1223 may be silica gel, rubber, plastic, or the like. The ear hook elastic cover layer 1223 may cover the ear hook elastic metal filament 1221. The ear hook elastic cover layer 1223 may further cover the first ear hook housing 121 and the second ear hook housing 123. The ear hook elastic cover layer 1223 may also cover the second wire stuck part 1219. In some embodiments, it may be possible to make the power plug-in hole 1233, or the like, to be exposed. The ear hook elastic cover layer 1223 may also cover at least a part of the joint part 1222, and may cover the first wire stuck part 1224.

Figure 17:
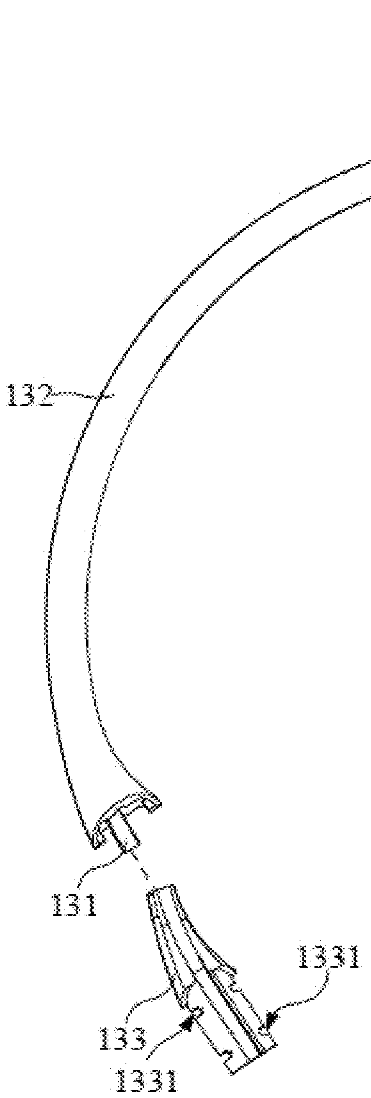
FIG. 17 is an exploded diagram illustrating a structure of a rear hook assembly according to some embodiments of the present disclosure.

FIG. 17 is an exploded diagram illustrating a structure of a rear hook assembly according to some embodiments of the present disclosure.

As shown in FIG. 17, the rear hook assembly 13 may include a rear hook elastic metal filament 131, a rear hook elastic cover layer 132 covering the rear hook elastic metal filament 131, and the inserting parts 133 arranged at the two ends of the rear hook elastic metal filament 131. The rear hook elastic cover layer 132 may also cover at least a part of the inserting parts 133.

The inserting parts 133 may be configured to be matched to and plugged in the ear hook assembly 12. In some embodiments, one side of the first ear hook housing 121 away from the connection member 122 may be configured with the plug-in hole 1218 communicating with the accommodating space 120. The plug-in hole 1218 and the second slot 1212 may be arranged adjacently. The inserting parts 133 may be matched to and plugged in the plug-in hole 1218. At least one of the inserting parts 133 may be configured with two groups of notches 1331 arranged at an interval in the length direction. That is, the two groups of notches 1331 may be arranged on at least one of the inserting parts 133 at an interval in the length direction of the inserting parts 133, and each group of notches 1331 may include at least one notch 1331. The rear hook elastic metal filament 131 may be inserted into the inserting parts 133 via one end of the inserting parts 133. A group of notches 1331 may be close to the inserting parts 133, and the other group of notches 1331 may be arranged at one end away from the inserting parts 133.

In some embodiments, the two groups of notches 1331 may be sequentially arranged along the direction from one end of the inserting parts 133 to the other end of the inserting parts 133. The notches 1331 near one end of the inserting parts 133 may be configured to perform mold positioning. The notches 1331 away from one end of the inserting parts 133 may be configured to be stuck and matched to the first ear hook housing 121.

In some embodiments, the two groups of notches 1331 may be divided into a first group of notches 1331 and a second group of notches 1331. The first group of notches 1331 may be arranged at one end away from the inserting parts 133 and configured to be stuck and matched to the ear hook assembly 12.

Figure 18:
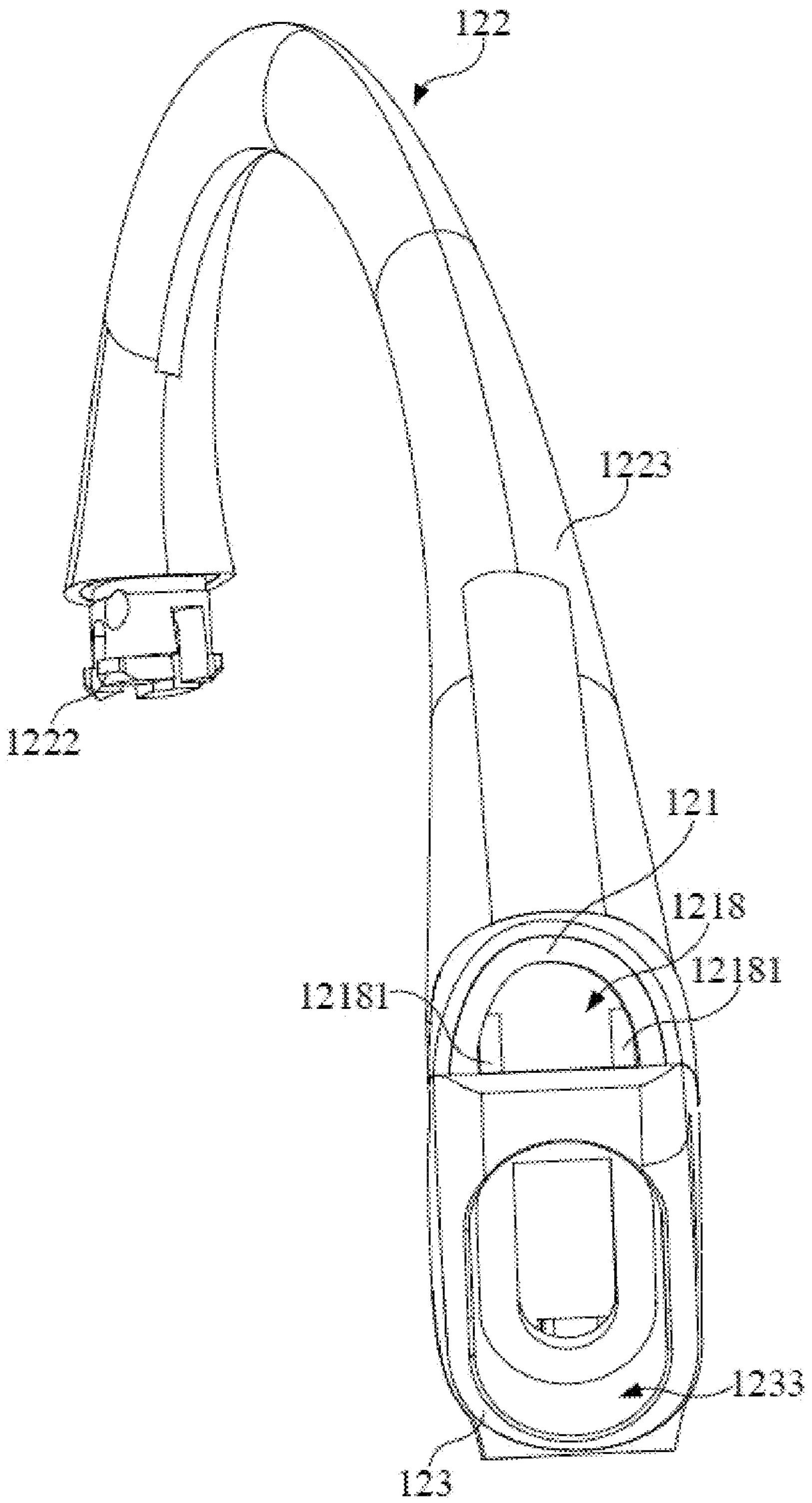
FIG. 18 is a structural diagram illustrating an ear hook assembly according to some embodiments of the present disclosure.

FIG. 18 is a structural diagram illustrating an ear hook assembly according to some embodiments of the present disclosure.

As shown in FIG. 17 and FIG. 18, stuck connection parts 12181 may be arranged protruding from the first ear hook housing 121. For example, the stuck connection parts 12181 may be arranged protruding from the plug-in hole of the first ear hook housing 121. The inserting parts 133 may be inserted into the plug-in hole 1218 and the stuck connection parts 12181 may be inserted into the first group of notches 1331, thereby restricting the relative movement between the ear hook assembly 12 and the rear hook assembly 13.

The second group of notches 1331 may be arranged at one end close to the inserting parts 133 and configured for mold positioning. That is, the second group of notches 1331 may be combined with corresponding convex structures on the mold, thereby accurately fixing the inserting parts 133 to a certain position and performing other processes to enhance the good product rate. For example, the inserting parts 133 and the rear hook elastic metal filament 131 may be positioned by the second group of notches 1331, and the rear hook elastic cover layer 132 may be formed by injection molding.

In some embodiments, the notches 1331 may be arranged to extend along a direction along edges at two sides of a central axis of the inserting part 133 to the central axis. Each group of notches 1331 may include two notches 1331, and two notches 1331 in each group may be arranged opposite to each other.

Figure 19:
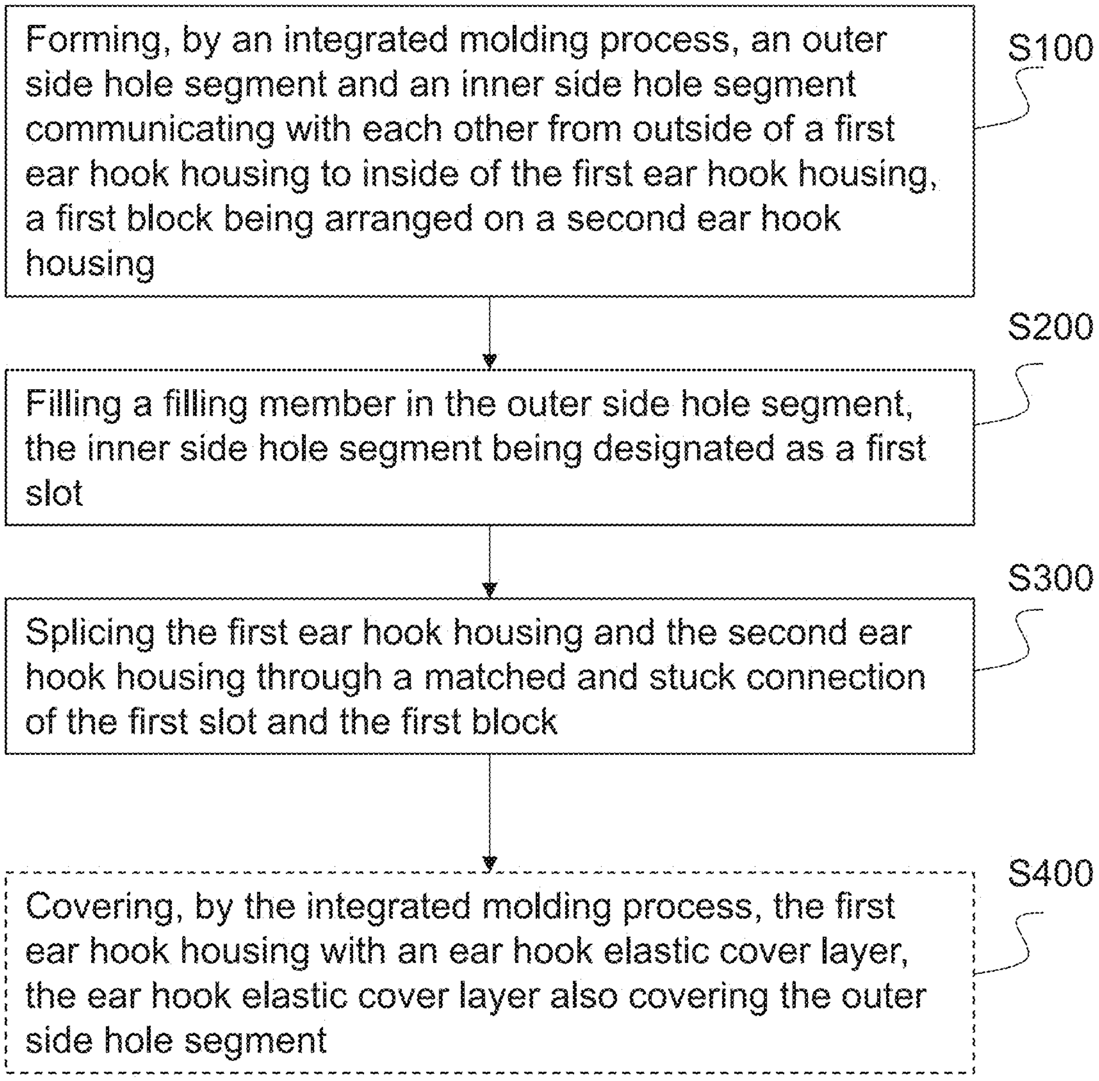
FIG. 19 is an exemplary flowchart of a method for manufacturing a bone conduction earphone according to some embodiments of the present disclosure.

FIG. 19 is an exemplary flowchart illustrating a method for manufacturing a bone conduction earphone according to some embodiments of the present disclosure.

In some embodiments, the bone conduction earphone shown in FIG. 15 has the most complicated structure. The first ear hook housing 121 may be configured with an outer side hole segment 1215 and an inner side hole segment 1216 communicating with each other in a direction from the outside of the accommodating space 120 to the inside of the accommodating space 120. Therefore, the method shown in FIG. 19 of the present disclosure is further described herein based on the first ear hook housing 121 corresponding to FIG. 19.

In operation S100, the outer side hole segment and the inner side hole segment communicating with each other may be formed on the first ear hook housing via an integral molding manner, and the first block may be formed on the second ear hook housing.

In some embodiments, the integral molding manner may include, but is not limited to, any one or a combination of injection molding manufacturing, 3D printing, extrusion manufacturing, and blow molding manufacturing. It should be understood that in actual manufacturing, due to the need to use molds in injection molding, extrusion, and blow molding, the problem of the demolding direction in the manufacturing process may need to be considered. The 3D printing manner belongs to mold-free manufacturing, therefore, there is no need to consider issues such as the demolding direction.

In actual production, due to the high manufacturing efficiency and low manufacturing cost of injection molding, extrusion, and blow molding, the first ear hook housing 121 and the second ear hook housing 123 may be manufactured through the three manufacturing manners mentioned above.

The manufacture of the second ear hook housing 123 may be realized through conventional plastic manufacturing manners, and details may not be described herein. For the first ear hook housing 121, during the integral molding process, the outer side hole segment 1215 and the inner side hole segment 1216 may be formed in sequence from the outside of the first ear hook housing 121 to the inside of the first ear hook housing 121. The pattern drawing direction may not be carried out in the first sub-accommodating space 1210, but may be carried out outside the first ear hook housing 121. The outer side hole segment 1215 may be filled with the filling member 1217, so that the remaining inner side hole segment 1216 may be designated as the first slot 1211, thereby effectively reducing the difficulty and complexity of manufacturing and saving costs.

In operation S200, the outer side hole segment of the first ear hook housing may be filled with the filling member, and the inner side hole segment may be designated as the first slot.

The filling member filled into the outer side hole segment of the first ear hook housing may be, for example, a rubber member, such as a hard glue. After the outer side hole segment is filled and blocked, the inner side hole segment may be designated as the first slot. The opening direction of the inner side hole segment may face the accommodating space and may be matched with the first block.

In some embodiments, the filling member 1217 may be filled into the outer side hole segment 1215 through the integral molding manner (e.g., an injection molding manner).

In some embodiments, the cross-sectional area of the outer side hole segment perpendicular to the communication direction of the outer side hole segment and the inner side hole segment may be greater than the cross-sectional area of the inner side hole segment perpendicular to the communication direction of the outer side hole segment and the inner side hole segment (as shown in FIG. 15). Since the corresponding cross-sectional area of the outer side hole segment is greater than the corresponding cross-sectional area of the inner side hole segment, it may be facilitated to fill the filling member into the outer side hole segment, thereby achieving a better blocking effect and forming the first slot more quickly.

In operation S300, the first slot may be matched to and plugged in the first block to splice the first ear hook housing and the second ear hook housing. That is, as shown in FIG. 15, the first slot 1211 may be matched to and plugged in the first block 1231 to splice the first ear hook housing 121 and the second ear hook housing 123 to form the accommodating space 120.

In some embodiments, in order to protect the first ear hook housing, the method 1900 may further include operation S400. In operation S400, the first ear hook housing may be covered with the ear hook elastic cover layer through the integral molding manner, and the ear hook elastic cover layer may cover the outer side hole segment. The material of the ear hook elastic cover layer may be silicone, rubber, plastic, or the like, or other materials. Specifically, the ear hook elastic cover layer 1223 may cover the first ear hook housing 121 through the injection molding, and the ear hook elastic cover layer 1223 may also cover the outer side hole segment 1215.

For the molding manners and operations of other structures of the ear hook assembly 12 not mentioned in the operations mentioned above, other structures of the ear hook assembly 12 not mentioned in the operations mentioned above may be manufactured through existing molding manners based on the specific structure of the ear hook assembly 12 mentioned above, which is not repeated herein.

The basic concepts have been described above, apparently, to those skilled in the art, the detailed disclosure is only taken as an example, and does not constitute a limitation to the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, a number illustrating elements and the count of attributes may be used. It should be understood that such numbers describing the embodiments, in some examples, may use "about", "approximately", "generally", or the like, to modify. Unless otherwise stated, "about", "approximately", or "generally" may indicate that the number is allowed to vary by +20%. Accordingly, in some embodiments, the numerical parameters set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and parameters configured to illustrate the broad scope of some embodiments of the present disclosure are approximations, the numerical values in specific examples may be as accurate as possible within a practical scope.

For each patent, patent application, patent application publication, and other materials referenced by this specification, such as articles, books, instructions, publications, documentation, etc., hereby incorporated herein by reference. Except for the application history documentation of the present specification or conflict, there is also an except for documents (currently or after the present specification) in the most wide range of documents (currently or later). It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A bone conduction earphone, comprising:

a loudspeaker assembly; and an ear hook assembly including a first ear hook housing and a second ear hook housing, wherein the first ear hook housing includes a first sub-accommodating space, the second ear hook housing includes a second sub-accommodating space, the first ear hook housing is spliced and matched with the second ear hook housing by a first connection assembly such that the first sub-accommodating space and the second sub-accommodating space are combined to form an accommodating space, and a length direction of the accommodating space is perpendicular to a thickness direction of the accommodating space; and the first connection assembly is configured to restrict a relative movement of the first ear hook housing and the second ear hook housing along the length direction.

2. The bone conduction earphone of claim 1, wherein the first connection assembly includes a first slot and a first block;

one of the first slot and the block is arranged on the first ear hook housing, and the other of the first slot and the block is arranged on the second ear hook housing; and the first block is matched and stuck connected to the first slot to restrict the relative movement of the first ear hook housing and the second ear hook housing along the length direction and the thickness direction.

3. The bone conduction earphone of claim 2, wherein the first slot is arranged on the first ear hook housing, an opening direction of the first slot facing the first accommodating space; and the first block is arranged on the second ear hook housing, the first block being configured to be matched and stuck connected to the first slot.

4. The bone conduction earphone of claim 3, wherein the first ear hook housing is configured with an outer side hole segment and an inner side hole segment that communicate with each other from outside of the first sub-accommodating space to inside of the first sub-accommodating space, the outer side hole segment being filled with a filling member, and the inner side hole segment being designated as the first slot.

5. The bone conduction earphone of claim 4, wherein a cross-sectional area of the outer side hole segment perpendicular to a communication direction of the outer side hole segment and the inner side hole segment is greater than a cross-sectional area of the inner side hole segment perpendicular to the communication direction of the outer side hole segment and the inner side hole segment.

6. The bone conduction earphone of claim 2, wherein the first connection assembly further includes a second slot and a second block;

one of the second slot and the second block is arranged on the first ear hook housing, and the other of the second slot and the second block is arranged on the second ear hook housing; and the second slot is matched and stuck connected to and the second block to restrict a relative movement of the first ear hook housing and the second ear hook housing along a splicing direction, the splicing direction being perpendicular to the length direction and the thickness direction.

7. The bone conduction earphone of claim 6, wherein the first ear hook housing is configured with the second slot, the first slot and the second slot being arranged along the length direction and having a same opening direction; and the second ear hook housing is protrudingly configured with the second block, the first block being arranged opposite to the first slot along the length direction, and the second block being arranged opposite to the second slot along the length direction.

8. The bone conduction earphone of claim 7, wherein the first slot and the second slot are arranged at intervals along the length direction.

9. The bone conduction earphone of claim 8, wherein the first slot and the second slot are arranged on two sides of the first ear hook housing along the length direction, respectively, the opening direction of the first slot facing the first sub-accommodating space, and the opening direction of the second slot being away from the first sub-accommodating space; and the first block and the second block are arranged on two sides of the second ear hook housing along the length direction, respectively, an extension direction of the first block being away from the second sub-accommodating space, and an extension direction of the second block facing the second sub-accommodating space.

10. The bone conduction earphone of claim 7, wherein the ear hook assembly further includes a connection member, wherein one end of the connection member is connected to the first ear hook housing, and the other end of the connection member is connected to the loudspeaker assembly;

the first slot is arranged on a side of the first ear hook housing close to the connection member; and the second slot is arranged on a side of the first ear hook housing away from the connection member.

11. The bone conduction earphone of claim 10, wherein part of the second ear hook housing away from the connection member is configured with a power plug-in hole, the power plug-in hole communicating with the accommodating space, and the power plug-in hole being configured to accommodate a power supply interface;

the second block is arranged adjacent to the power plug-in hole, and the second block is closer to the accommodating space than the power plug-in hole; and a projection of the second block and a projection of the power plug-in hole on a first reference plane perpendicular to the length direction overlap each other.

12. The bone conduction earphone of claim 11, wherein the projection of the second block and the projection of the power plug-in hole on a second reference plane perpendicular to the splicing direction overlap each other.

13. The bone conduction earphone of claim 1, wherein a splicing edge of the first ear hook housing is configured with a first blocking part, and a splicing edge of the second ear hook housing is configured with a second blocking part; and the first blocking part is matched with the second blocking part to restrict the relative movement of the first ear hook housing and the second ear hook housing along the length direction.

14. The bone conduction earphone of claim 1, wherein the ear hook assembly further includes a connection member, wherein one end of the connection member is connected to the first ear hook housing, and the other end of the connection member is connected to the loudspeaker assembly;

the connection member includes an ear hook elastic metal filament, a joint part, and an ear hook elastic cover layer, the joint part being connected to one end of the ear hook elastic metal filament, the ear hook elastic cover layer at least covering the ear hook elastic metal filament, and the joint part being configured to be plugged and matched with the loudspeaker assembly;

the joint part includes a first wire stuck part, and the first ear hook housing includes a second wire stuck part; and the ear hook elastic cover layer is configured with a lead channel, a wiring group drawn out from the loudspeaker assembly enters the accommodating space through the first wire stuck part, the lead channel, and the second wire stuck part in sequence, and the first wire stuck part and the second wire stuck part are configured to block and stop the wiring group in a radial direction of the wiring group.

15. The bone conduction earphone of claim 14, wherein the first wire stuck part includes two first wire sub-stuck members arranged at intervals along the thickness direction, the two first wire sub-stuck members being staggered from each other along the length direction of the wiring group; and the second wire stuck part includes two second wire sub-stuck members arranged at intervals along the thickness direction, the two second wire sub-stuck members being arranged opposite to each other.

16. The bone conduction earphone of claim 1, wherein the bone conduction earphone further includes a stick microphone assembly, the stick microphone assembly including an elastic connecting rod and a sound pickup assembly, one end of the elastic connecting rod being connected to the loudspeaker assembly, and the other end of the elastic connecting rod being connected to the sound pickup assembly; and the elastic connecting rod is configured to cause an average amplitude attenuation rate of vibrations of a phonic frequency band generated by the loudspeaker assembly to be not less than a preset threshold when the vibrations transmit from one end of the elastic connecting rod to the other end of the elastic connecting rod.

17. The bone conduction earphone of claim 16, wherein the loudspeaker assembly includes a first loudspeaker housing, a second loudspeaker housing, a loudspeaker, a rotation member, and a press-holding member, the first loudspeaker housing is matched and connected to the second loudspeaker housing to form a containment space for containing the loudspeaker;

the first loudspeaker housing is configured with a first through hole and a second through hole arranged at intervals, the rotation member is rotatably inserted into the first through hole, and one end of the elastic connecting rod is connected to the rotation member;

the first through hole and the second through hole communicate with the containment space such that the wiring group of the stick microphone assembly passes through the first through hole, the containment space, and the second through hole; and the press-holding member is arranged in the containment space and covers the first through hole, and the press-holding member is configured to press and hold the wiring group of the stick microphone assembly that passes through the first through hole to the second through hole.

18. The bone conduction earphone of claim 17, wherein the press-holding member includes a hard cover plate and an elastomer, the hard cover plate and the elastomer being stacked, the hard cover plate being farther from the first through hole than the elastomer; and the elastomer is configured to contact the wiring group, a hardness of the hard cover plate being greater than a hardness of the elastomer.

19. A bone conduction earphone, comprising:

a loudspeaker assembly; and an ear hook assembly including a first ear hook housing and a second ear hook housing, wherein the first ear hook housing includes a first sub-accommodating space, the second ear hook housing includes a second sub-accommodating space, the first ear hook housing is spliced and matched with the second ear hook housing by a first connection assembly such that the first sub-accommodating space and the second sub-accommodating space are combined to form an accommodating space, and a length direction of the accommodating space is perpendicular to a thickness direction of the accommodating space;

the first connection assembly includes a first slot and a first block;

one of the first slot and the block is arranged on the first ear hook housing, and the other of the first slot and the block is arranged on the second ear hook housing; and the first block is matched and stuck connected to the first slot to restrict a relative movement of the first ear hook housing and the second ear hook housing along the length direction and the thickness direction.

20. A bone conduction earphone, comprising:

a loudspeaker assembly; and an ear hook assembly including a first ear hook housing and a second ear hook housing, wherein the first ear hook housing includes a first sub-accommodating space, the second ear hook housing includes a second sub-accommodating space, the first ear hook housing is spliced and matched with the second ear hook housing by a first connection assembly such that the first sub-accommodating space and the second sub-accommodating space are combined to form an accommodating space, and a length direction of the accommodating space is perpendicular to a thickness direction of the accommodating space;

a splicing edge of the first ear hook housing is configured with a first blocking part, and a splicing edge of the second ear hook housing is configured with a second blocking part; and the first blocking part is matched with the second blocking part to restrict a relative movement of the first ear hook housing and the second ear hook housing along the length direction.

* * * * *